United States Patent
Hidaka et al.

(10) Patent No.: US 7,899,489 B2
(45) Date of Patent: Mar. 1, 2011

(54) WIRELESS COMMUNICATION DEVICE AND WIRELESS COMMUNICATION METHOD

(75) Inventors: Hiroyuki Hidaka, Yokohama (JP);
Hiroyuki Matsumoto, Yokohama (JP);
Yuji Kakuda, Yokohama (JP)

(73) Assignee: Kyocera Corporation, Kyoto (JP)

( * ) Notice: Subject to any disclaimer, the term of this patent is extended or adjusted under 35 U.S.C. 154(b) by 621 days.

(21) Appl. No.: 11/927,348

(22) Filed: Oct. 29, 2007

(65) Prior Publication Data

US 2008/0117876 A1 May 22, 2008

(30) Foreign Application Priority Data

Oct. 30, 2006 (JP) ................. 2006-294406
Nov. 29, 2006 (JP) ................. 2006-321975
Nov. 29, 2006 (JP) ................. 2006-322132

(51) Int. Cl.
*H04M 1/00* (2006.01)

(52) U.S. Cl. ........ 455/552.1; 455/75; 455/130; 455/134; 455/73; 455/135; 455/164.1; 455/173.1; 455/192.1; 455/550.1; 370/331

(58) Field of Classification Search .................. 455/101, 455/552.1, 75, 130, 134, 73, 135, 164.1, 455/173.1, 192.1, 550.1; 370/331
See application file for complete search history.

(56) References Cited

U.S. PATENT DOCUMENTS

| 7,796,956 B2 * | 9/2010 | Khayrallah et al. ............ 455/75 |
| 2005/0245207 A1 * | 11/2005 | Suzuki et al. ................. 455/101 |
| 2008/0117876 A1 * | 5/2008 | Hidaka et al. ................. 370/331 |

FOREIGN PATENT DOCUMENTS

JP 2004-015162 1/2004

* cited by examiner

*Primary Examiner* — Matthew D Anderson
*Assistant Examiner* — April G Gonzales
(74) *Attorney, Agent, or Firm* — DLA Piper LLP (US)

(57) ABSTRACT

On transition of a 1x system from a standby state in which standby processing is performed to out of service state in an SHDR mode, the standby processing for the 1x system using a receiver unit (RX1) is halted and, when an instruction to switch from a call through an EVDO system using a transmitter-receiver unit (RX0/TX) and/or the receiver unit (RX1) to a call through the 1x system using the transmitter-receiver unit (RX0/TX) during the halt state is detected, a system detection process for detecting the 1x system is performed by using the receiver unit (RX1).

17 Claims, 21 Drawing Sheets

| Primary Antenna | EVDO | 1x | EVDO | 1x | EVDO |
|---|---|---|---|---|---|
| Secondary Antenna | EVDO(diversity) | | EVDO(diversity) | | EVDO(diversity) |

(b)

| Primary Antenna | EVDO | | | | |
|---|---|---|---|---|---|
| Secondary Antenna | EVDO(diversity) | 1x | EVDO(diversity) | 1x | EVDO(diversity) |

FIG. 3

|  | Primary Antenna | Secondary Antenna |
|---|---|---|
| 800MHz band | -3 | -10 |
| 2GHz band | 0 | -3 |

(dBi)

WIRELESS COMMUNICATION DEVICE AND WIRELESS COMMUNICATION METHOD

CROSS-REFERENCE TO RELATED APPLICATIONS

The present application claims the benefit of priorities to Japanese Patent Applications No. 2006-294406 (filed on Oct. 30, 2006), No. 2006-321975 (filed on Nov. 29, 2006), and No. 2006-322132 (filed on Nov. 29, 2006), which are entirely incorporated herein by reference.

BACKGROUND OF THE INVENTION

1. Field of the Invention

The present invention relates to a wireless communication device and a wireless communication method.

2. Related Art Statement

There are many methods compliant with different standards for wireless communication device such as mobile phones today. For example, TDMA and CDMA are widely used as methods for mobile (cellular) phones in Japan.

A wireless communication device is typically designed to conform to one standard method. However, a frequency band available to each standard method for mobile phones, for example, is becoming scarce as more and more mobile phones are being used. Accordingly, attempts are made to shift to multiband methods. Also, in order to provide high capability services, a shift to multiband/multimode is being made in which hand-off between different frequency bands and communications using multiple communication systems (for example cdma2000 1x and cdma2000 1xEV-DO systems) are performed.

By way of such a multiband/multimode-capable wireless communication device, there is a mobile phone which uses, for example, TDMA in combination with CDMA and in which a TDMA-based transmitter-receiver unit and a CDMA-based transmitter are coupled to a primary antenna and a CDMA-based receiver is coupled to a secondary antenna (for example, see Japanese Patent Application Laid-Open No. 2004-15162).

Recently, it is envisioned that multiband/multimode-capable mobile phones include SHDR (Simultaneous Hybrid Dual Receiver) functionality in which transmission and reception in a cdma2000 1xEV-DO system are performed using a primary antenna while reception in a cdma2000 1x system is performed using a secondary antenna in order to improve the throughput of communication through the primary antenna.

FIG. 1 is a functional block diagram schematically showing a configuration of major parts of a mobile phone set ( ) including such an SHDR functionality. The mobile phone set (cellular phone set/portable phone set) has a 1x system (line switching system) using cdma2000 1x in the 800 MHz band (hereinafter often simply referred to as the 800 MHz band) and cdma2000 1x in the 2 GHz band (hereinafter often simply referred to as the 2 GHz band) as well as an EVDO system (packet switching system) using 1xEV-DO. The mobile phone set also has the capability of receiving signals of a GPS frequency of 1575.42 MHz (hereinafter sometimes simply referred to as the 1.5 GHz band). The mobile phone set includes a transmitter (Tx) 101 connected to a baseband unit 100 including a modulating circuit and a demodulating circuit, a primary receiver (primary Rx) 102, and a secondary receiver (secondary Rx) 103.

The transmitter 101 and the primary receiver 102 are connected to a primary antenna 105 through a duplexer 104 and they are capable of transmitting and receiving signals in the 800 MHz band and 2 GHz band. The secondary receiver 103 is connected to a secondary antenna 106 and is capable of receiving signals in the 800 MHz band, 2 GHz band, and 1.5 GHz band independently of the primary receiver 102.

The mobile phone set uses a diversity scheme in communication though the EVDO system (hereinafter sometimes simply referred to as EVDO communication) and periodically receives a notification (paging) which notifies the arrival of an incoming signal from a base station in communication using the 1x system (hereinafter sometimes simply referred to as 1x communication), thus monitoring the arrival of a voice telephony call. As such a operation mode, there are provided a hybrid mode and an SHDR mode using the SHDR function.

In the hybrid mode, as shown in (a) of FIG. 2, the primary antenna 105 is periodically switched to 1x communication during EVDO communication to receive a paging. On the other hand, in the hybrid mode, the secondary antenna 106 also can diversity-receive a paging using 1x communication in synchronization with the primary antenna 105. In the SHDR mode, as shown in (b) of FIG. 2, the primary antenna 105 is allowed to continue EVDO communication while the secondary antenna 106 is periodically switched to 1x communication to receive a paging, thereby monitoring the arrival of an incoming voice call.

As shown in (b) of FIG. 2, the throughput of EVDO communication in the SHDR mode can be improved as compared with the hybrid mode because EVDO communication is continued without switching the primary antenna 105 to 1x communication in the SHDR mode.

However, because the secondary antenna 106 receives signals in three bands, namely 800 MHz, 2 GHz, and 1.5 MHz bands, the antenna gains of the secondary antenna 106 in the 800 MHz and 2 GHz bands in general are lower than those of the primary antenna 105 which transmits and receives signals in two bands, 800 MHz and 2 GHz bands. For example, as shown FIG. 3, the antenna gains of the primary antenna 105 in the 800 MHz and 2 GHz bands are −3 dBi and 0 dBi, respectively, whereas the antenna gains of the secondary antenna 106 in the 800 MHz and 2 GHz are −10 dBi and −3 dBi, respectively. Accordingly, the ability of capturing a paging from a base station in the SHDR mode is lower than that in the hybrid mode.

Therefore, as shown in FIG. 1, conventionally, the actual sensitivity to an incoming signal in 1x communication received at the primary receiver 102 or the secondary receive 103 and input in the baseband unit 100 is compared in a mode selector 108 with upper and lower thresholds of sensitivity to a signal in 1x communication that are stored in a threshold memory 107 beforehand.

The baseband unit 100, the transmitter 101, the primary receiver (primary Rx) 102, and the secondary receiver (secondary Rx) 103 are controlled so that, when the sensitivity to a signal in 1x communication exceeds the upper threshold in the hybrid mode, the hybrid mode switches into the SHDR mode, and when the sensitivity to a signal in 1x communication decreases to become equal to or lower than the lower threshold in the SHDR mode, the SHDR mode switches into the hybrid mode.

SUMMARY OF THE INVENTION

As has been described above, when voice communication through the 1x system is monitored during communication through the EVDO system in the SHDR mode, diversity reception is disabled to allow one RF receiver to monitor voice communication by the 1x system, thereby continuing communication through the EVDO system while at the same time monitoring voice communication through the 1x system.

However, when a radio wave signal becomes weak while voice communication through the 1x system is being monitored or a terminal communicating through the 1x system performs hand-off across areas or becomes out-of-service (unreachable), the communication through the EVDO system is interrupted to allocate the two antennas to the processing for the 1x system for reasons of the performance of reception and transmission requirements, with the exception of data communication using Internet Protocol Video Telephony (IPVT) through the EVDO system. Because IPVT is a kind of telephony, voice communication through a 1x system is performed. However, when both antennas are occupied by the Tx system because the terminal is out-of-service, monitoring of voice communication by the 1x system is discontinued in order to maintain the quality of IPVT communication.

Therefore, once a terminal communicating through the 1x system becomes out-of service (i.e., unreachable) during IPVT communication (packet communication through the EVDO system), the strength of radio wave signals from the 1x system after that time cannot be known. Therefore, when switching is done from IPVT to voice telephony (voice communication through the 1x system), the 1x system must be detected to check communication followed by the end of the IPVT connection. However, this technique is unreliable because the connection is broken if the mobile phone set is still out-of-service. In addition, even if the mobile phone set is in-service (reachable), it takes considerable time between the end of IPVT connection and the start of voice telephony connection because firstly the 1x system must be detected or scanned.

A mobile phone set including both of 1x and EVDO system capabilities described above does not use EVDO system communication (packet communication) to handle incoming calls and therefore does not monitor the strength of radio wave signals from an EVDO system during voice communication through the 1x system. When switching from voice telephony communication (voice communication through the 1x system) to IPVT communication using an EVDO system is to be performed during such a communication, the voice telephony communication is ended before scanning for an EVDO system. Accordingly, there is a problem that switching from voice telephony communication to IPVT communication fails and connection is broken if the mobile phone set is out of the service area (i.e., out-of-service) covered by the EVDO system. Even if the mobile phone set is in the service area (i.e., in-service) covered by the EVDO system, it takes considerable time to switch from voice telephony communication to IPVT communication because firstly an EVDO system must be scanned.

Another problem is that, because the strength of radio wave signals from an EVDO system is not monitored during voice telephony communication through a 1x system, it cannot be determined whether an EVDO system is in-service (reachable) or not when a message notifying of the arrival of an incoming IPVT call through the EVDO system is received through a 1x system during voice telephony communication through the 1x system, therefore the user is not notified of the arrival of the incoming call and cannot respond to the incoming IPVT call.

The present invention has been made in view of these problems and an object of the present invention is to provide a wireless communication device and a wireless communication method that enable a call to be continued without an interruption when switching from Internet Protocol Video Telephony (IPVT) to voice telephony and are capable of reducing the time between the end of IPVT communication and the start of voice telephony communication.

Another object of the present invention is to provide a wireless communication device and a wireless communication method that enable a call to be continued without an interruption when switching from voice telephony to IPVT and are capable of reducing the time between the end of voice telephony communication and the start of IPVT communication.

Yet another object of the present invention is to provide a wireless communication device and a wireless communication method that allows a user to respond to an incoming IPVT call when a message notifying the arrival of the IPVT call is received during a voice telephony call.

To achieve these objects, according to the present invention, a wireless communication device includes:

a transmitter-receiver unit capable of transmitting and receiving information through a first wireless communication system and a second wireless communication system;

a receiver unit capable of receiving information through the first wireless communication system and the second wireless communication system;

a setter to set a mode in which the receiver unit is switched from the second wireless communication system to the first wireless communication system at a predetermined timing during a call through the second wireless communication system using at least the transmitter-receiver unit and/or the receiver unit to perform standby processing for the first wireless communication system using the receiver unit;

an instruction unit for instructing to switch from a call through the second wireless communication system using the transmitter-receiver unit and/or the receiver unit to a call through the first wireless communication system using the transmitter-receiver unit; and a controller for halting, when the first wireless communication system transitions from a standby state, in which standby processing is performed, to out of service state in the mode set by the setter, the standby processing for the first wireless communication system using the receiver unit, and for performing, when detecting an instruction to switch issued through the instruction unit in the halt state, a system detection process for detecting the first wireless communication system by using the receiver unit.

When the first wireless communication system is detected by the system detection process, the controller preferably performs a process for clearing a call through the second wireless communication system and performs a process for transmitting a signal to a party with which the device has been communicating through the second wireless communication system, by using the transmitter-receiver unit through the first wireless communication system. If the first wireless communication system is not detected by the system detection process, the controller preferably outputs a response to the instruction to switch which indicates that switching is impossible. The response indicating that switching is impossible is preferably displayed on a screen.

According to another embodiment of the present invention, a wireless communication device includes:

a transmitter-receiver unit capable of transmitting and receiving information through a first wireless communication system and a second wireless communication system;

a receiver unit capable of receiving information through the first wireless communication system and the second wireless communication system;

a setter to set a mode in which the receiver unit is switched from the second wireless communication system to the second wireless communication system at a predetermined timing during a call through the second wireless communication system using at least the transmitter-receiver unit and the receiver unit, and to perform standby processing for the first wireless communication system using the receiver unit;

an instruction unit for instructing to switch from a call through the second wireless communication system using the transmitter-receiver unit and the receiver unit to a call through the first wireless communication system using the transmitter-receiver unit;

and a controller for halting, when the first wireless communication system transitions from a standby state, in which standby processing is performed, to out of service state in the mode set by the setter, the standby processing for the first wireless communication system using the receiver unit, and for performing, when detecting an instruction to switch issued through the instruction unit in the halt state, a process for clearing the call through the second wireless communication system by using the transmitter-receiver unit and performs a system detection process for detecting the first wireless communication system by using the receiver unit.

According to another aspect of the present invention, a wireless communication method using a transmitter-receiver unit capable of transmitting and receiving information through a first wireless communication system and a second wireless communication system and a receiver unit capable of receiving information through the first wireless communication system and the second wireless communication system includes the steps of:

when the first wireless communication system transitions from a standby state in which standby processing is performed to out of service state in a mode in which the receiver unit is switched from the second wireless communication system to the first wireless communication system at a pre-determined timing during a call through the second wireless communication system using at least the transmitter-receiver unit and/or the receiver unit and, halting standby processing for the first wireless communication system using the receiver unit; and when an instruction to switch from a call through the second wireless communication system using the transmitter-receiver unit and/or the receiver unit to a call through the first wireless communication system using the transmitter-receiver unit during the halt state, performing a process for detecting the first wireless communication system by using the receiver.

According to another embodiment of the present invention, a wireless communication method using a transmitter-receiver unit capable of transmitting and receiving information through a first wireless communication system and a second wireless communication system and a receiver unit capable of receiving information through the first wireless communication system and the second wireless communication system includes the steps of:

when the first wireless communication system transitions from a standby state in which standby processing is performed to out of service state in a mode in which the receiver unit is switched from the second wireless communication system to the first wireless communication system at a pre-determined timing during a call through the second wireless communication system using at least the transmitter-receiver unit and/or the receiver unit and, halting standby processing for the first wireless communication system using the receiver unit; and when an instruction to switch from a call through the second wireless communication system using the transmitter-receiver unit and/or the receiver unit to a call through the first wireless communication system using the transmitter-receiver unit during the halt state, performing a process for clearing a call through the second wireless communication system by using the transmitter-receiver unit and performing a process for detecting the first wireless communication system by using the receiver.

According to yet another aspect of the present invention, a wireless communication device includes:

a transmitter-receiver unit capable of transmitting and receiving information through a first wireless communication system and a second wireless communication system;

a receiver unit capable of receiving information through at least the first wireless communication system and the second wireless communication system;

an instruction unit for instructing to switch from a call through the first wireless communication system using the transmitter-receiver unit to a call through the second wireless communication system using the transmitter-receiver unit; and a controller for performing, when an instruction to switch issued through the instruction unit is detected during a call through the first wireless communication system using the transmitter-receiver unit, a system detection process for detecting the second wireless communication system by using the receiver unit.

When the second wireless communication system is detected by the system detection process, the controller preferably performs a process for clearing a call through the first wireless communication system using the transmitter-receiver unit and performs system setting of the second wireless communication system by using the transmitter-receiver unit. After performing system setting of the second wireless communication system by using the transmitter-receiver unit, the controller preferably performs a process for using the second wireless communication system to call a party with which the device has been communicating through the first wireless communication system. If the second wireless communication system is not detected by the system detection process, the controller preferably outputs a response to the instruction to switch indicating that switching is impossible. The response that indicates that switching is impossible is preferably displayed on a screen.

According to another aspect of the present invention, a wireless communication method using a transmitter-receiver unit capable of transmitting and receiving information through a first wireless communication system and a second wireless communication system and a receiver unit capable of receiving information through at least the first wireless communication system and the second wireless communication system includes the steps of:

making a call through the first wireless communication system using the transmitter-receiver unit; and when an instruction to switch from a call through the first wireless communication system using the transmitter-receiver unit to a call through the second wireless communication system using the transmitter-receiver unit is detected during the call through the first wireless communication system using the transmitter-receiver unit, performing a system detection process for detecting the second wireless communication system by using the transmitter-receiver unit.

According to another embodiment of the present invention, a wireless communication device includes:

a transmitter-receiver unit capable of transmitting and receiving information through a first wireless communication system and a second wireless communication system;

a receiver unit capable of receiving information through at least the first wireless communication system and the second wireless communication system; and a controller for performing, when receiving a message indicating an incoming call of the second wireless communication system through the first wireless communication system during a call through the first wireless communication system using the transmitter-receiver unit, a system detection process for detecting the second wireless communication system by using the receiver unit.

When the second wireless communication system is detected by the system detection process, the controller preferably notifies an incoming call of the second wireless communication system. When receiving an instruction to respond to an incoming call of the second wireless communication system, the controller preferably performs a process for clearing a call through the first wireless communication system using the transmitter-receiver unit and uses the transmitter-receiver unit to perform system setting of the second wireless communication system.

According to yet another aspect of the present invention, a wireless communication method using a transmitter-receiver unit capable of transmitting and receiving information through a first wireless communication system and a second wireless communication system and a receiver unit capable of receiving information through at least the first wireless communication system and the second wireless communication system includes the steps of:

making a call through the first wireless communication system using the transmitter-receiver unit;

and when receiving a message indicating an incoming call of the second wireless communication system through the first wireless communication system during a call through the first wireless communication system using the transmitter-receiver unit, performing a system detection process for detecting the second wireless communication system by using the receiver unit.

BRIEF DESCRIPTION OF THE DRAWINGS

FIG. 2 is a diagram illustrating hybrid and SHDR modes in EVDO communication;

FIG. 3 is a diagram depicting gains of primary and secondary antennas shown in FIG. 1;

DETAILED DESCRIPTION OF THE PREFERRED EMBODIMENTS

Figure 4:
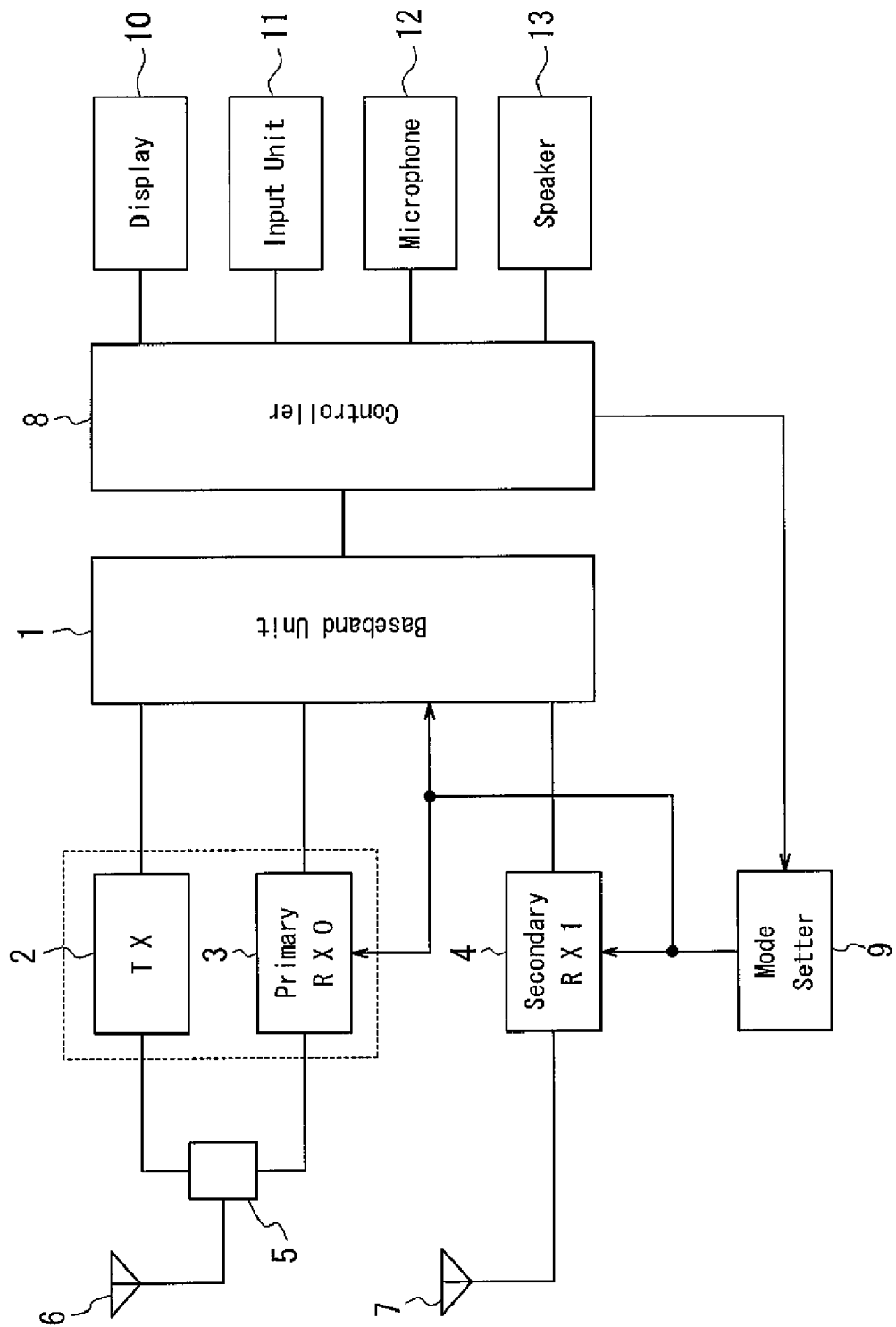
FIG. 4 is a functional block diagram schematically representing a configuration of a mobile phone set according to a first embodiment of the present invention.

A first embodiment of the present invention will be described with reference to the accompanying drawings. FIG. 4 is a functional block diagram schematically representing a configuration of a mobile phone set as a wireless communication device (terminal) according to the first embodiment. In a similar fashion to the mobile phone set shown in FIG. 1, the mobile phone set according to the first embodiment has a first wireless communication system using cdma2000 1x in the 800 MHz and 2 GHz bands (hereinafter sometimes simply referred to as the 1x system) and a second wireless communication system using cdma2000 1xEV-DO (hereinafter sometimes simply referred to as the EVDO system), and the capability of receiving GPS-frequency signals in the 1.5 GHz band.

The mobile phone set shown in FIG. 4 includes a baseband unit 1, a transmitter (TX) 2, a primary receiver (primary RX0) 3, a secondary receiver (secondary RX1) 4, a duplexer 5, a primary antenna 6, a secondary antenna 7, a controller 8, a mode setter (setter) 9, a display 10, an input unit (instruction unit) 11, a telephone microphone 12, and a telephone speaker 13.

The transmitter (TX) 2, the primary receiver (primary RX0) 3, and the secondary receiver (secondary RX1) 4 are connected to the baseband unit 1, which includes a modulating circuit and a demodulating circuit. The transmitter 2 and the primary receiver 3 are connected to the primary antenna 6 through the duplexer 5 and are capable of transmitting and receiving signals in the 800 MHz and 2 GHz bands. The secondary receiver 4 is connected to the secondary antenna 7 and is capable of receiving signals in the 800 MHZ, 2 GHz, and 1.5 GHz bands. The transmitter 2, primary receiver 3, duplexer 5 and primary antenna 6 make up a transmitter-receiver unit. The secondary receiver 4 and the secondary antenna 7 make up a receiver unit.

The primary and secondary antennas 6 and 7 have antenna gains as shown in FIG. 3, for example. The primary antenna 6 has higher antenna gains in the 800 MHz and 2 GHz bands than that of the secondary antenna 7. Accordingly, the reception gains of 1x and EVDO systems by the receiver unit including the secondary antenna 7 are smaller than those of the transmitter-receiver unit including the primary antenna 6.

Figure 1:
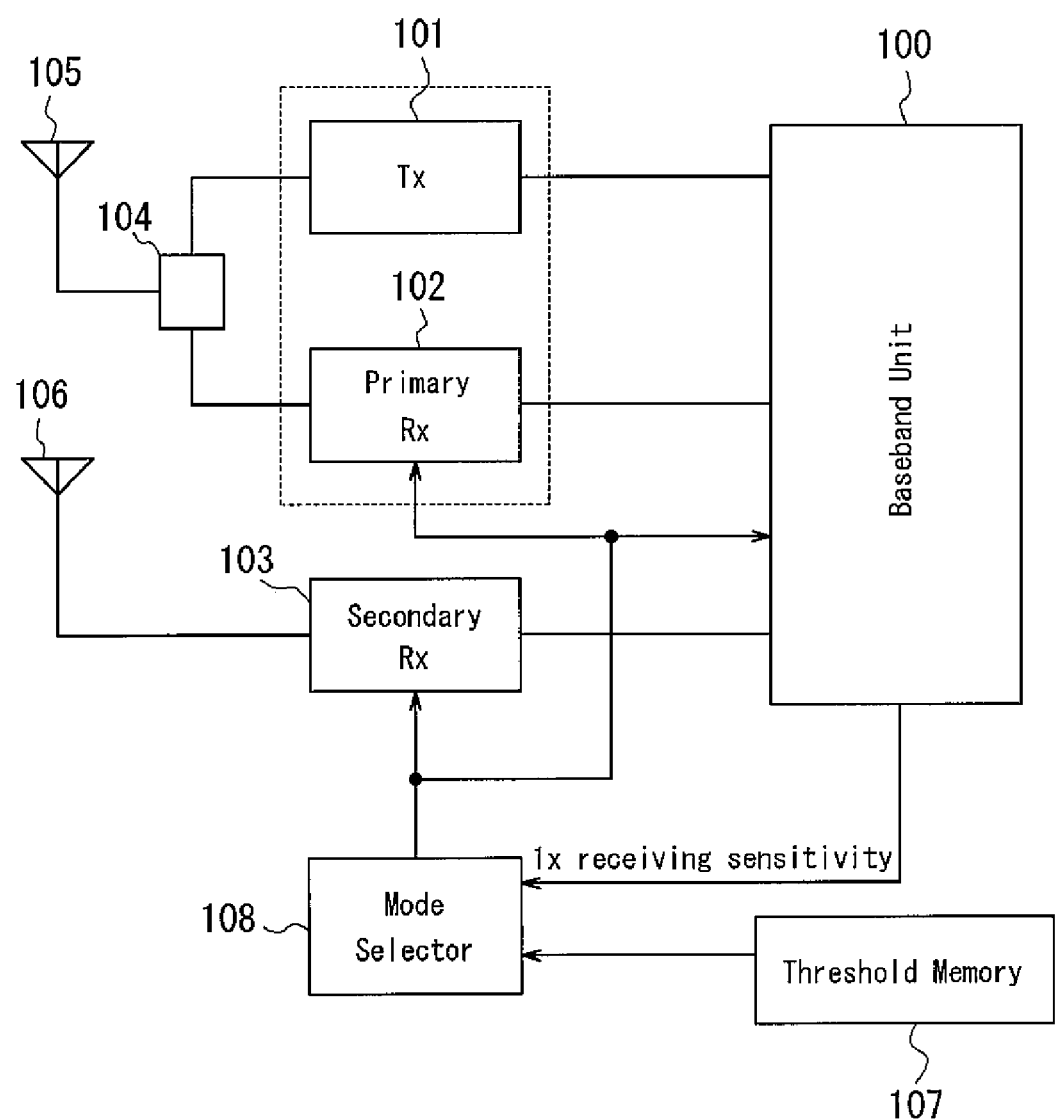
FIG. 1 is a functional block diagram schematically showing a configuration of major parts of a mobile phone set including such an SHDR functionality.

In a similar way to the mobile phone set shown in FIG. 1, the mobile phone set employs a diversity technique in the EVDO system, and periodically receives notification information (paging) that notifies of the arrival of an incoming call from a base station in the 1x system to monitor for an incoming voice call while switching the operation mode between a hybrid mode and an SHDR mode. The threshold memory shown in FIG. 1 is omitted from FIG. 4 and the description of which will be also omitted because the threshold memory is not directly related to the present invention.

In a method for wireless/radio communication by the mobile phone shown in FIG. 4 according to the first embodiment, once the 1x system changes or transitions from a standby state, in which standby processing is performed, to out of service state during an IPVT call through the EVDO system in the SHDR mode, the controller 8 halts the standby processing for the 1x system using the receiver unit and, when the controller 8 detects an instruction to switch to a 1x system call provided from the input unit (instruction unit) 11 during the halt state, the controller 8 starts a system detecting process in which the receiver unit is used to scan (search) for a 1x system.

Figure 5:
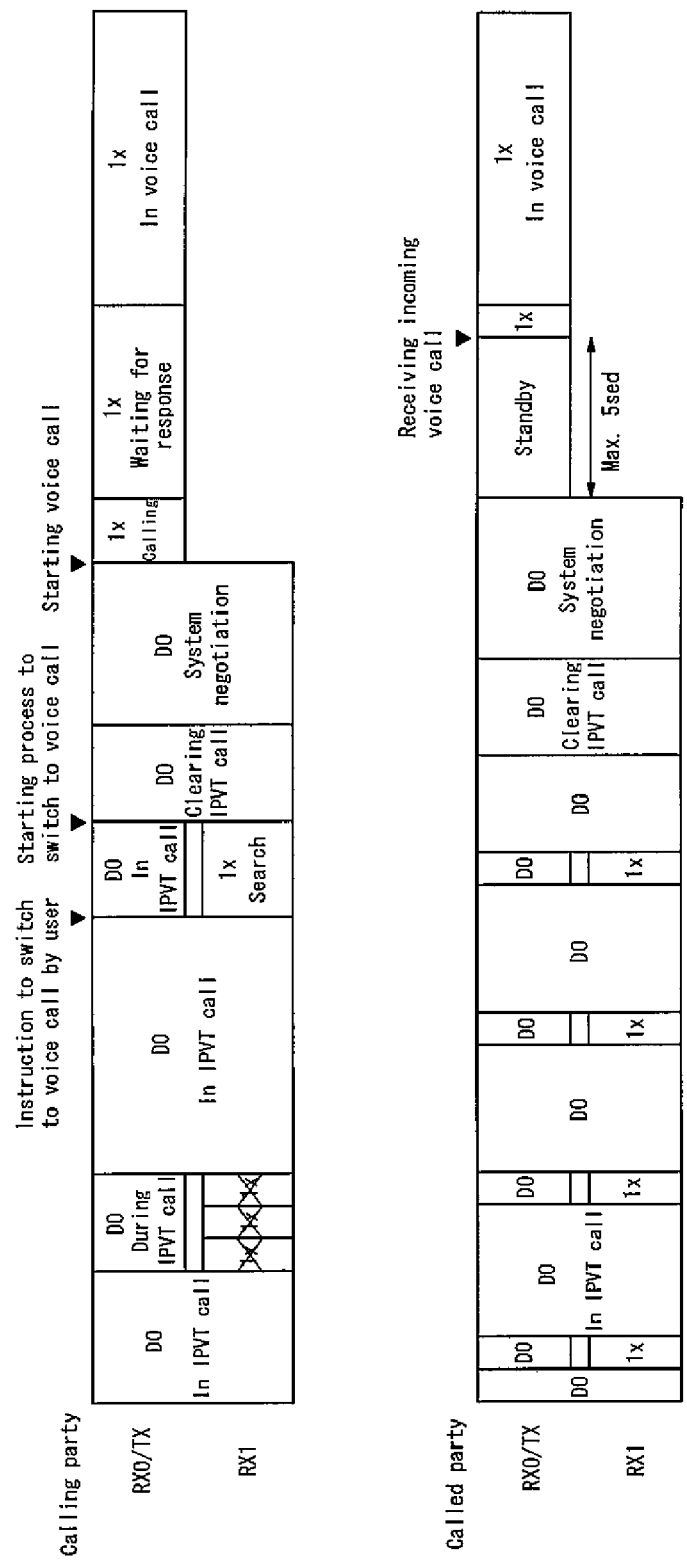
FIG. 5 is a diagram showing system status of transmitter-receiver and receiver units when switching is made from IPVT communication to voice telephony communication according to the first embodiment.

FIG. 5 shows a diagram showing system status of the transmitter-receiver and receiver units when switching is made from IPVT communication to voice telephony communication according to the first embodiment. The system status of the transmitter-receiver units (RX0/TX) and the receiver units (RX1) of a calling party and a called party is shown in chronological order from left to right. The upper half of each of the calling party part and the called party part represents the system status of the transmitter-receiver unit (RX0/TX) and the lower half represents the system status of the receiver unit (RX1). Once monitoring for a 1x system fails during an IPVT call through the EVDO system because the strength of radio wave signals from the 1x system becomes weak, or hand-off is performed over the service area that is not covered by the 1x system, or the 1x system becomes out-of service (unreachable), the controller 8 halts standby processing for the 1x system by the receiver unit (RX1). Upon receiving an instruction to switch to voice telephony communication (instruction to switching from IPVT communication through the EVDO system to voice telephony communication through the 1x system) from a user, the controller 8 uses the receiver unit (RX1) to scan for (detect) a 1x system while continuing the IPVT communication by using the transmitter-receiver unit (RX0/TX). The controller 8 scans for (detects) the 1x system and if the controller 8 determines that switching to voice telephony communication is possible, the controller 8 clears the IPVT call and perform system negotiation, then uses the transmitter-receiver unit (RX0/TX) to perform a process for transmitting a signal to the party with which the mobile phone set has been communicating using the IPVT through the 1x system. When a response is received from the party, voice telephony communication is performed through the 1x system. On the other hand, when the controller 8 scans for (searches for) the 1x system and determines that switching to voice telephony communication is not possible, the controller 8 output a response to the instruction to switch voice telephony issued from the user indicating that switching cannot be made. When a system switching is made, preferably a higher-level application is not changed and the same application is used.

Figure 6:
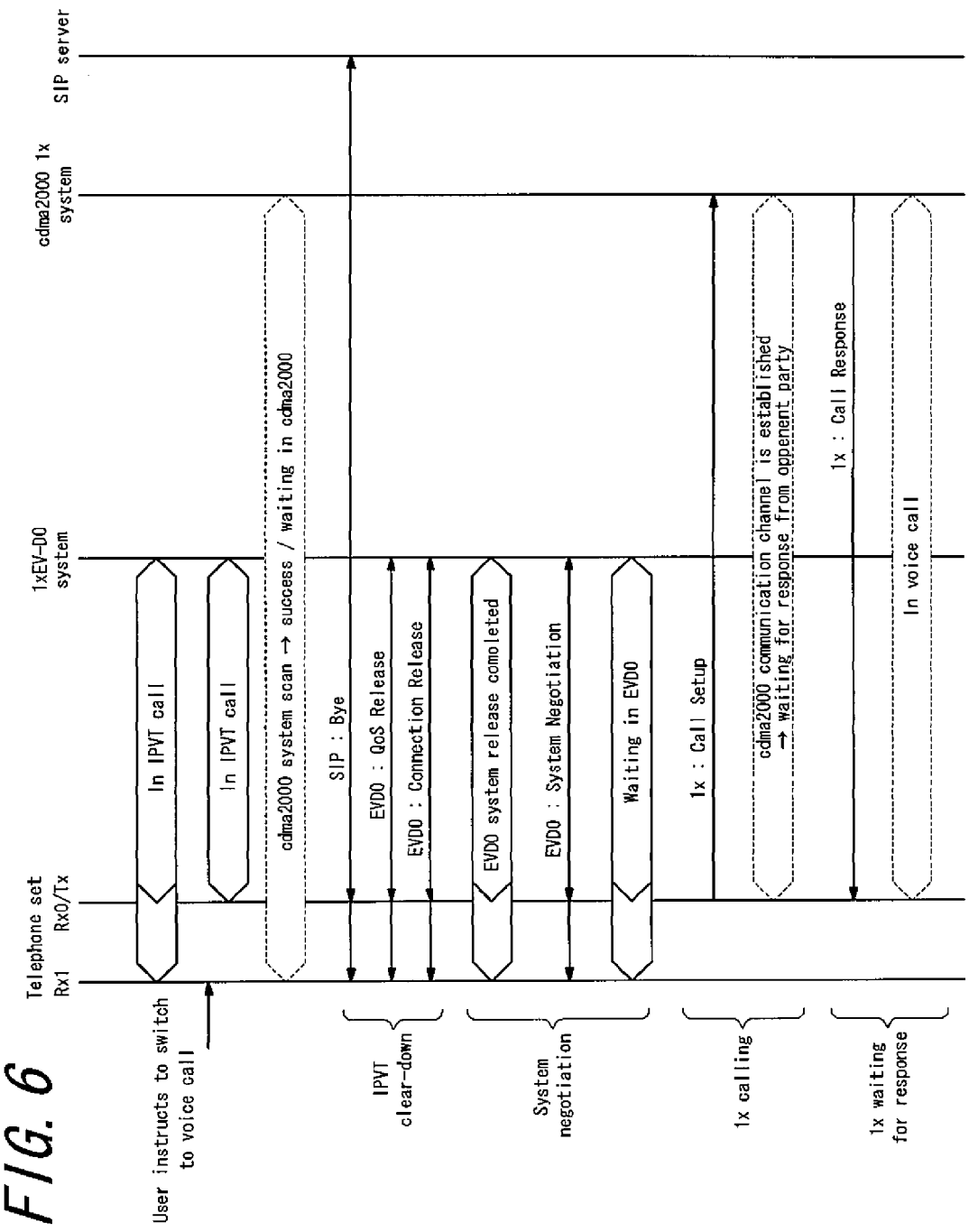
FIG. 6 is a sequence diagram illustrating switching from IPVT communication to voice telephony communication according to the first embodiment.

FIG. 6 is a sequence diagram illustrating switching from IPVT communication to voice telephony communication according to the first embodiment. When an instruction to switch to voice telephony communication is issued from the user during diversity reception, the switching instruction acts as a trigger to disable the diversity reception. Then, IPVT communication is performed by using the transmitter-receiver unit (RX0/TX) and scanning (searching) for the 1x system is started by using the receiver unit (RX1).

After the 1x system is successfully captured, the diversity reception is restored, the transmitter-receiver unit (RX0/TX) transmits a Bye message to an SIP server through, and QoS Release processing and Connection Release processing are performed for the EVDO system to clear or finish the IPVT call. After completion of releasing of the EVDO system, the transmitter-receiver unit (RX0/TX) performs system negotiation with the EVDO system and the EVDO system enters a standby state. Then, the transmitter-receiver unit (RX0/TX) transmits a Call Setup signal to the 1x system to call the party communicating using IPVT, establishes a communication channel, and waits for a response from the party. The mobile phone set receives a Call Response signal and starts a voice call.

Figure 7:
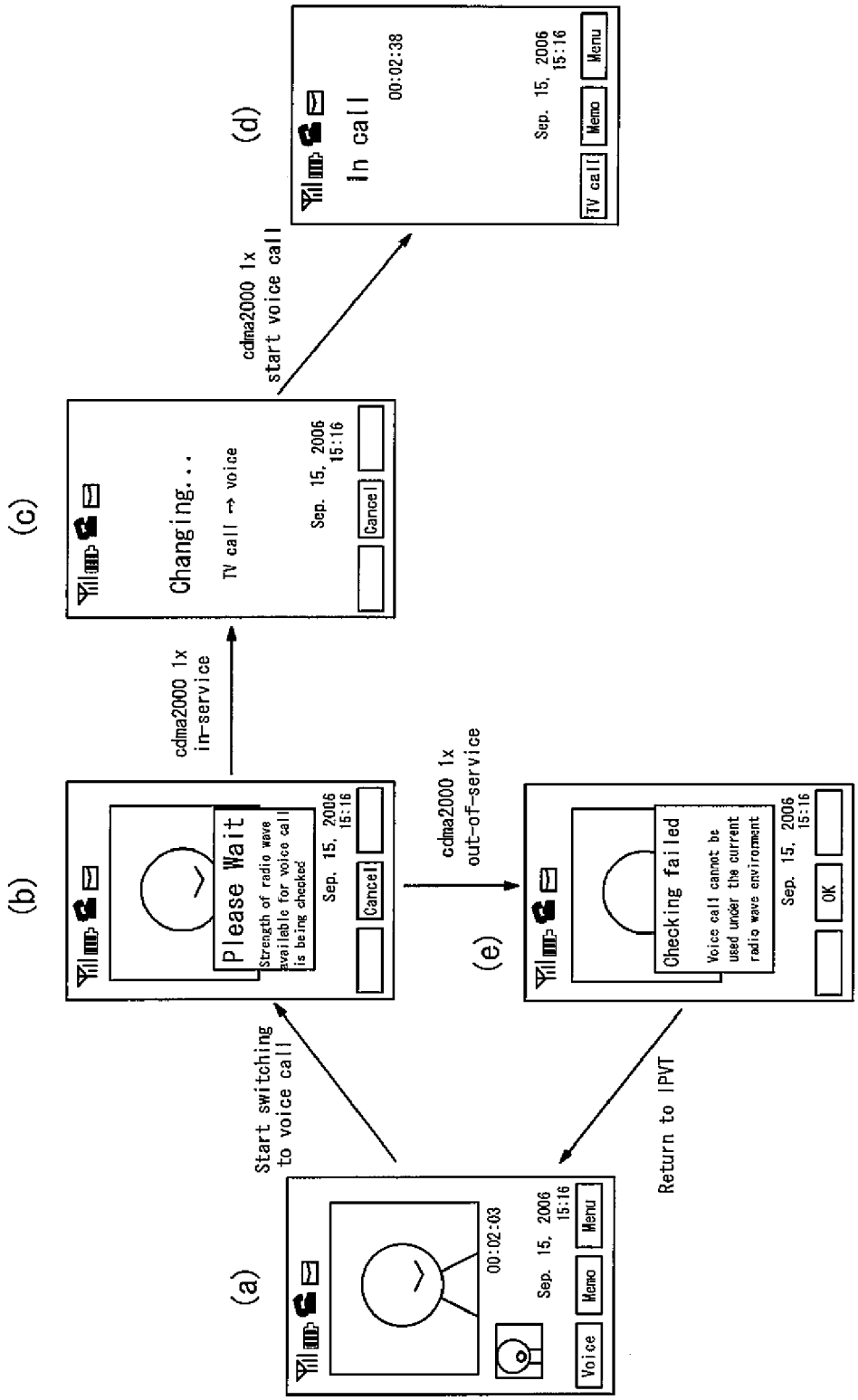
FIG. 7 is a diagram depicting screen transitions on a display of the mobile phone set.

FIG. 7 shows a diagram depicting screen transitions on the display of the mobile phone set. Part (a) of FIG. 7 shows a screen displayed on the display 10 during an IPVT call. When a user presses a "Voice" key to instruct the mobile phone set to switch to voice telephony, scanning (searching) for the 1x system is started by the receiver unit and a message "Please wait. Strength of a radio wave available for voice call is being checked." is displayed on the screen during the system scan as shown in part (b). When the 1x system is successfully captured, a message "Changing . . . from video (TV call) to Voice" is displayed on the screen as shown in part (c) while IPVT call clear-down, system negotiation, and 1x transmission processing are performed. When a response is returned from the party and a voice telephony call using 1x system is started, a message "Connected (In call)" is displayed on the screen as shown in part (d) If the 1x system cannot be captured while the screen shown in part (b) is displayed, a response message indicating that switching to voice telephony cannot be done ("Checking failed. Voice phone/call cannot be used under the current radio wave environment." is displayed as shown in part (e) and the mobile phone set goes back to IPVT.

Figure 8:
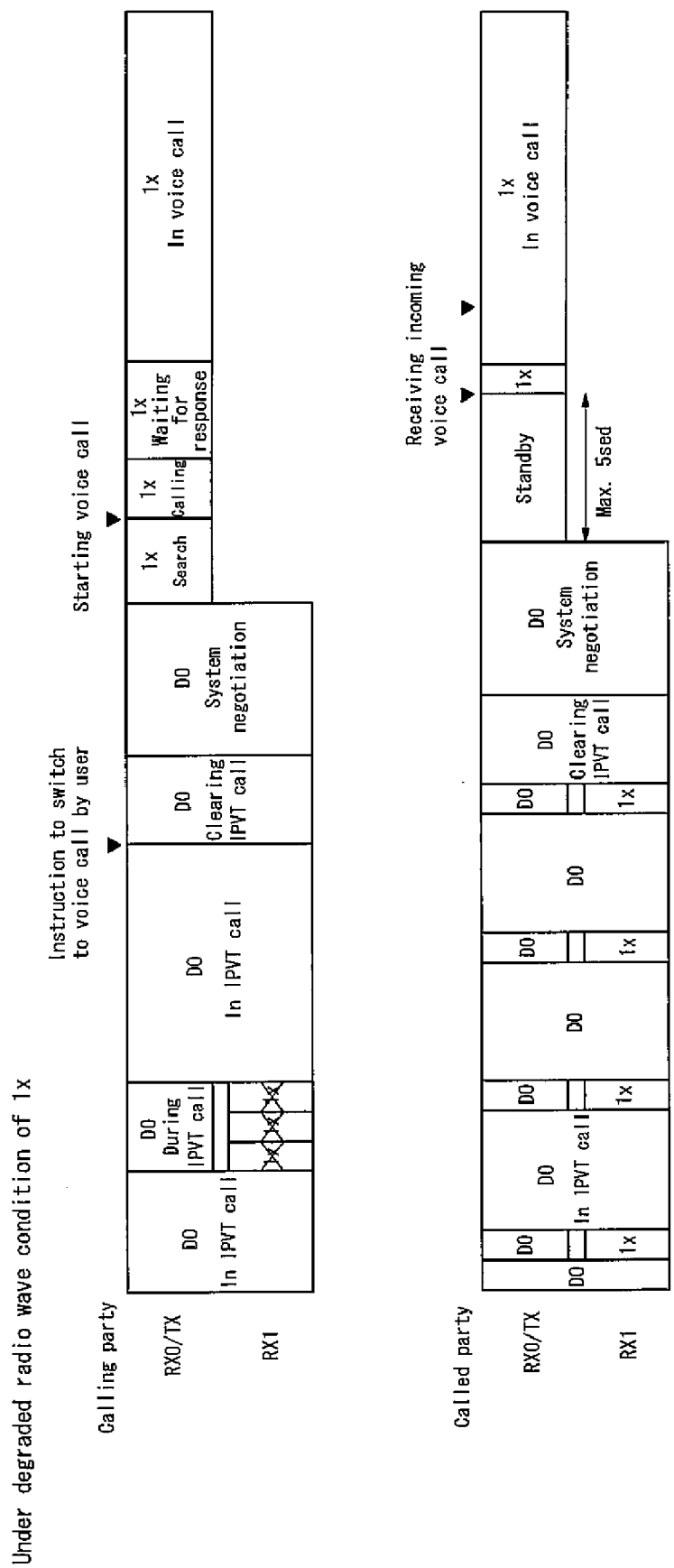
FIG. 8 is a diagram representing switching from IPVT communication to voice telephony communication.

FIG. 8 is a diagram representing switching from IPVT to voice telephony, in which an IPVT call using the EVDO system is cleared before the 1x system is searched for. As shown in FIG. 8, switching from IPVT communication to voice telephony communication can break connection if the 1x system is still out-of-service (unreachable) and a radio wave signal from the 1x system cannot be captured, and IPVT communication cannot be recovered because the 1x system is searched for after the IPVT call is cleared and system negotiation is performed. According to the first embodiment, in contrast, connection is not broken because switching from IPVT to voice telephony is done after the 1x system is detected and determination is made that switching to voice telephony is possible before switching is made from IPVT to voice telephony. If a radio wave signal from the 1x system cannot be captured, the user is notified of the failure of switching and can continue the IPVT communication. The 1x system is detected after system negotiation is performed in the switching shown in FIG. 8 whereas in the first embodiment the 1x system is already detected during IPVT communication instead of detecting the 1x system after system negotiation, therefore the time between the end of IPVT communication and the start of voice telephony communication can be reduced.

In a wireless communication method by the mobile phone shown in FIG. 4 according to a second embodiment, once a 1x system transitions from a standby state, in which standby processing is performed, to out of service state during an IPVT call using the EVDO system, the controller 8 halts the standby processing for the 1x system using the receiver unit and, when the controller 8 detects an instruction to switch to a call using the 1x system from the input unit (instruction unit) 11 during the halt state, the controller 8 uses the transmitter-receiver unit to perform a process for clearing the call using the 1x system and performs a system detection process for scanning (searching) for the 1x system by using the receiver unit.

Figure 9:
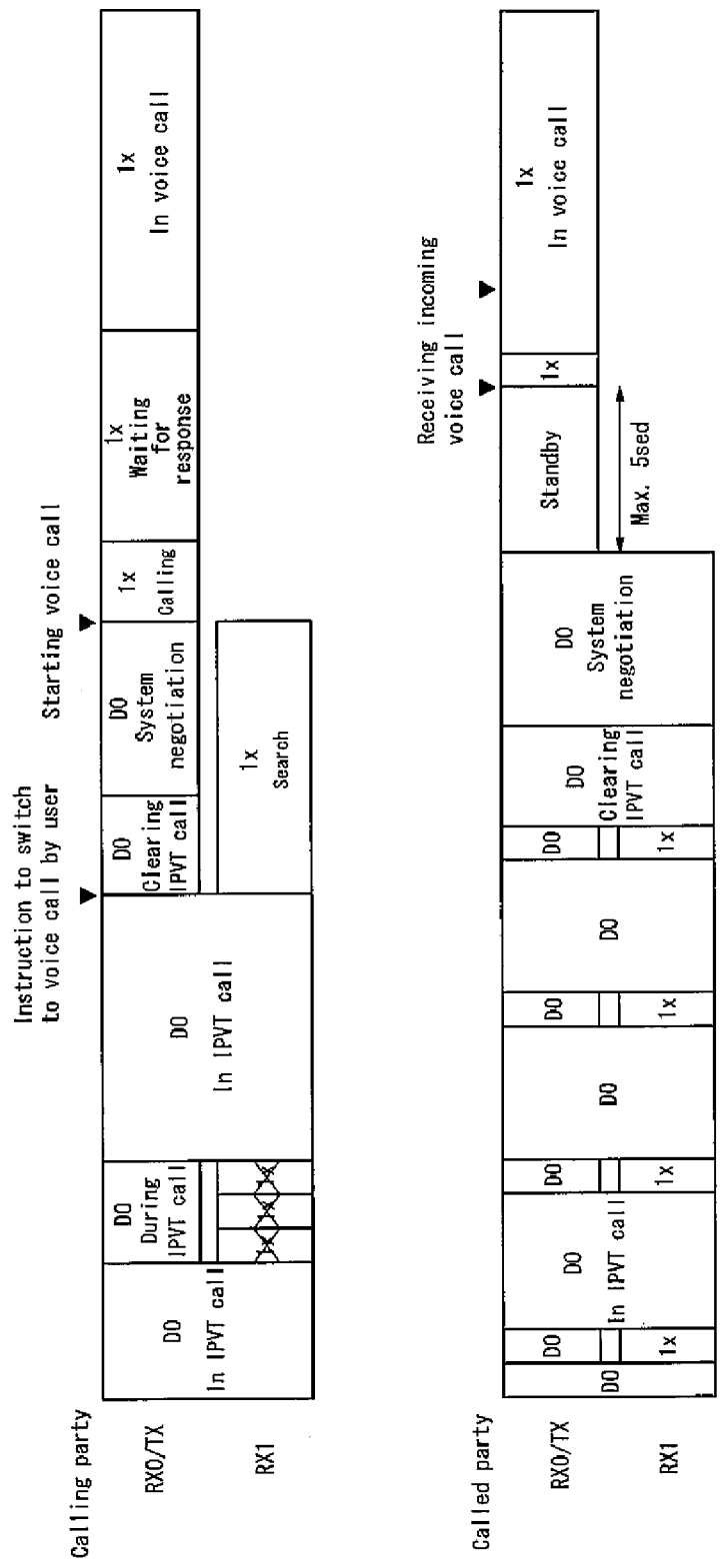
FIG. 9 is a diagram showing system status of transmitter-receiver and receiver units when switching is made from IPVT communication to voice telephony communication according to a second embodiment.

FIG. 9 shows system status of the transmitter-receiver and receiver units when switching is done from IPVT communication to voice telephony communication according to the second embodiment. Once monitoring for a 1x system fails because the strength of radio wave signals from the 1x system becomes weak, or hand-off is performed over the communication area covered by the 1x system, or the 1x system becomes out-of service (unreachable), standby processing for the 1x system by the receiver unit (RX1) is discontinued. When an instruction to switch to voice telephony communication is issued by a user, the controller 8 uses transmitter-receiver unit (RX0/TX) to perform a process for clearing the IPVT call and performs a system negotiation process, and uses the receiver unit (RX1) to scan (search) for the 1x system. The controller 8 then uses the transmitter-receiver unit (RX0/TX) to perform a process for transmitting a signal to the party with which the mobile phone set has been communicating using IPVT through the 1x system. When a response is returned from the party, the controller 8 starts a voice call through the 1x system.

Figure 10:
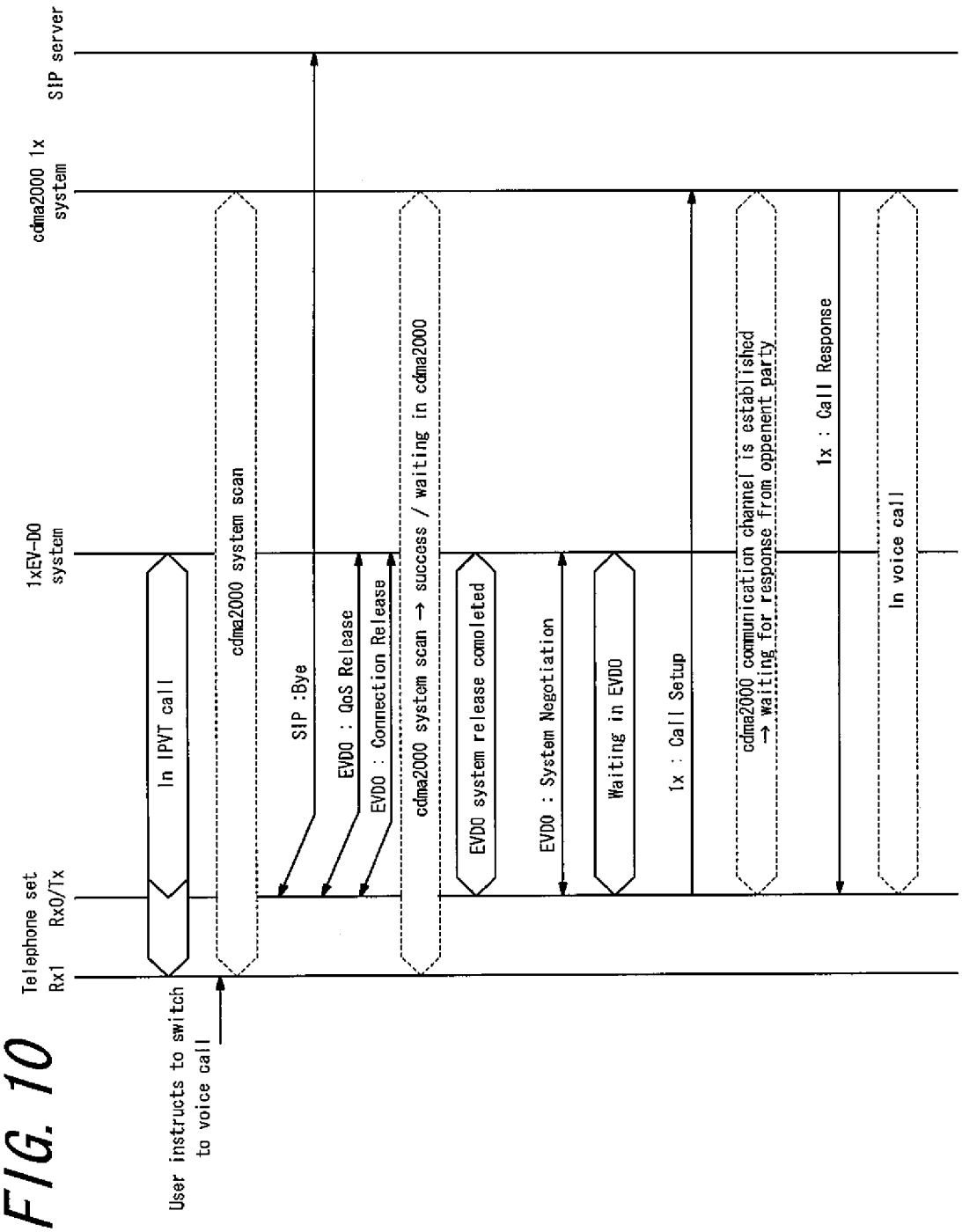
FIG. 10 is a sequence diagram illustrating switching from IPVT communication to voice telephony communication according to the second embodiment.

FIG. 10 is a sequence diagram illustrating switching from IPVT communication to voice telephony communication according to the second embodiment. When an instruction to switch to voice telephony is issued by a user during diversity reception, the switching instruction triggers transmission of a Bye message to an SIP server by the transmitter-receiver unit (RX0/TX) in parallel with scanning (searching) for a 1x system by the receiver unit (RX1). QoS Release processing and Connection Release processing are performed for the EVDO system to clear the IPVT call. Once the 1x system is detected while the process for clearing the IPVT call is being performed, the receiver unit (RX1) enters a standby state for the 1x system. After the EVDO system is released, the transmitter-receiver unit (RX0/TX) performs system negotiation with the EVDO system and the EVDO system enters a standby state. Then, a Call setup signal is transmitted from the transmitter-receiver unit (RX0/TX) to the 1x system to call the intended or opposite party communicating using IPVT, a communication channel is established and a response from the party is waited for. When a Call Response signal is received from the party, voice telephony communication is started.

According to the second embodiment, the 1x system can be scanned (searched) for during a time period between the start of the process for clearing the IPVT call and the end of the system negotiation. Thus, a longer time can be used for the scanning and many channels and other bands can be scanned (searched) for. When a radio wave signal from the 1x system can be captured, the process for clearing the IPVT call and the system negotiation are performed immediately after the instruction to switch to the voice telephony is issued from the user. Therefore, the time required for the switching can be reduced as compared with the first embodiment.

According to the second embodiment, if a radio wave signal from the 1x system cannot be captured, the call is broken. However, the time required for determining whether capture has failed or not can be shorten according to the second embodiment as compared with the switching method in FIG. 8 because scanning (search) for the 1x system is performed in parallel with the process for clearing the IPVT call and system negotiation process whereas in the switching method in FIG. 8 the scanning (search) for the 1x system is performed after the process for clearing the IPVT call and system negotiation process.

Figure 11:
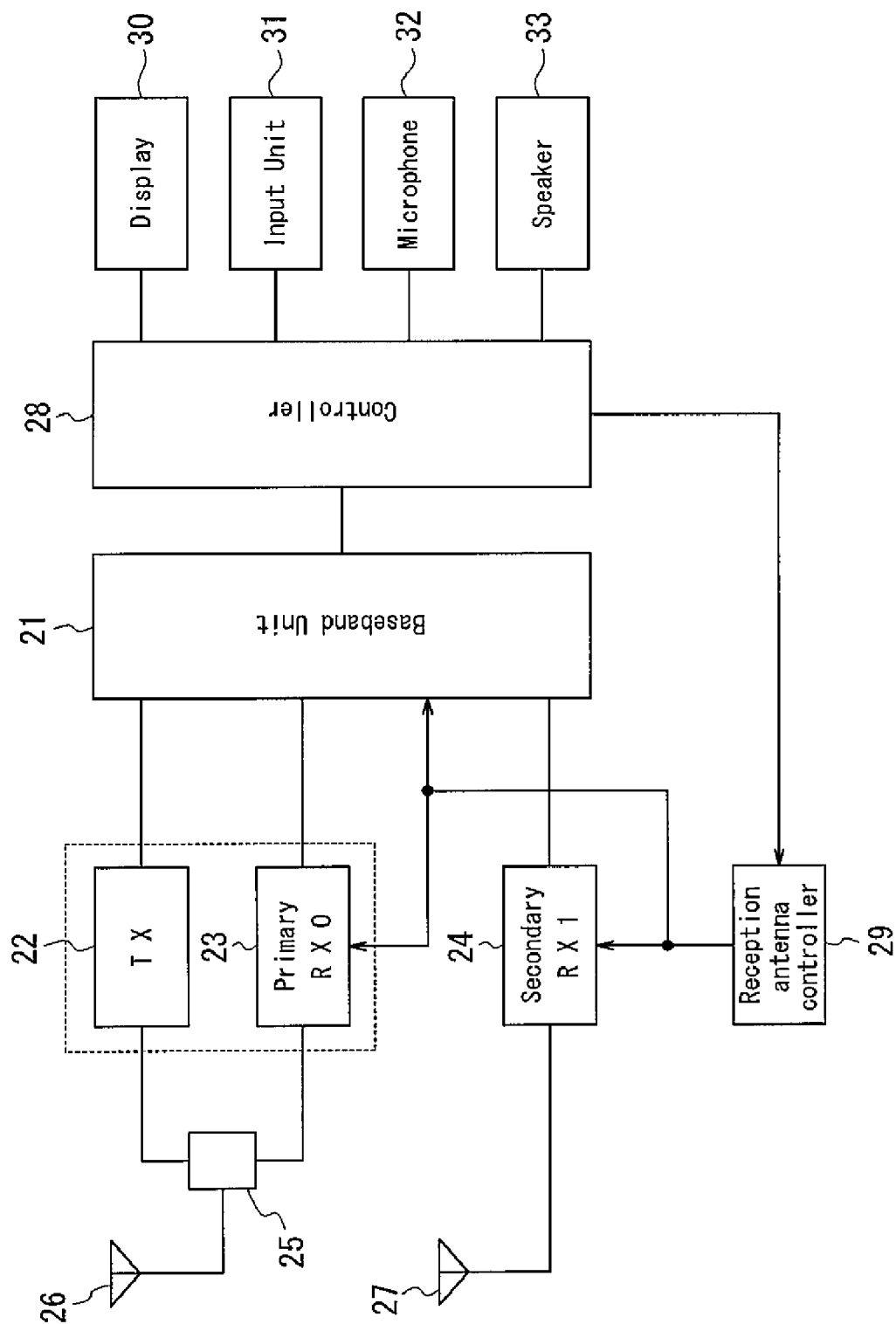
FIG. 11 is a functional block diagram schematically depicting a configuration of a mobile phone set according to a third embodiment.

A third embodiment of the present invention will be described with reference to several drawings. FIG. 11 is a functional lock diagram schematically showing a configuration of a mobile phone set which is a wireless communication device according to the third embodiment. Like the mobile phone set shown in FIG. 1, the mobile phone set according to the third embodiment has a first wireless communication system using cdma2000 1x in the 800 MHz and 2 GHz bands (hereinafter sometimes simply referred to as the 1x system) and a second wireless communication system using cdma2000 1xEV-DO (hereinafter sometimes referred to as the EVDO system) and the capability of receiving GPS-frequency signals in the 1.5 GHz band.

The mobile phone set (terminal) shown in FIG. 11 includes a baseband unit 21, a transmitter (TX) 22, a primary receiver (primary RX0) 23, a secondary receiver (secondary RX1) 24, a duplexer 25, a primary antenna 26, a secondary antenna 27, a controller 28, a reception antenna controller 29, a display 30, an input unit (instruction unit) 31, a telephone microphone 32, and a telephone speaker 33.

The transmitter (TX) 22, primary receiver (primary RX0) 23 and the secondary receiver (secondary RX1) 24 are connected to the baseband unit 21, which includes a modulating circuit and a demodulating circuit. The transmitter 22 and the primary receiver 23 are connected to the primary antenna 26 through the duplexer 25 and are capable of transmitting and receiving signals in the 800 MHz and 2 GHz bands. The secondary receiver 24 is connected to the secondary antenna 27 and is capable of receiving signals in the 800 MHZ, 2 GHz, and 1.5 GHz bands. The transmitter 22, primary receiver 23, duplexer 25 and primary antenna 26 make up a transmitter-receiver unit. The secondary receiver 24 and the secondary antenna 27 make up a receiver unit.

In a wireless communication method by the mobile phone set shown in FIG. 11, when an instruction to switch to IPVT through an EVDO system from an input unit (instruction unit) 11 is detected during a voice telephony call through a 1x system using the transmitter-receiver unit, a system detection process is performed for searching (scanning) for an EVDO system by using the receiver unit during the voice telephony through using the 1x system.

Figure 12:
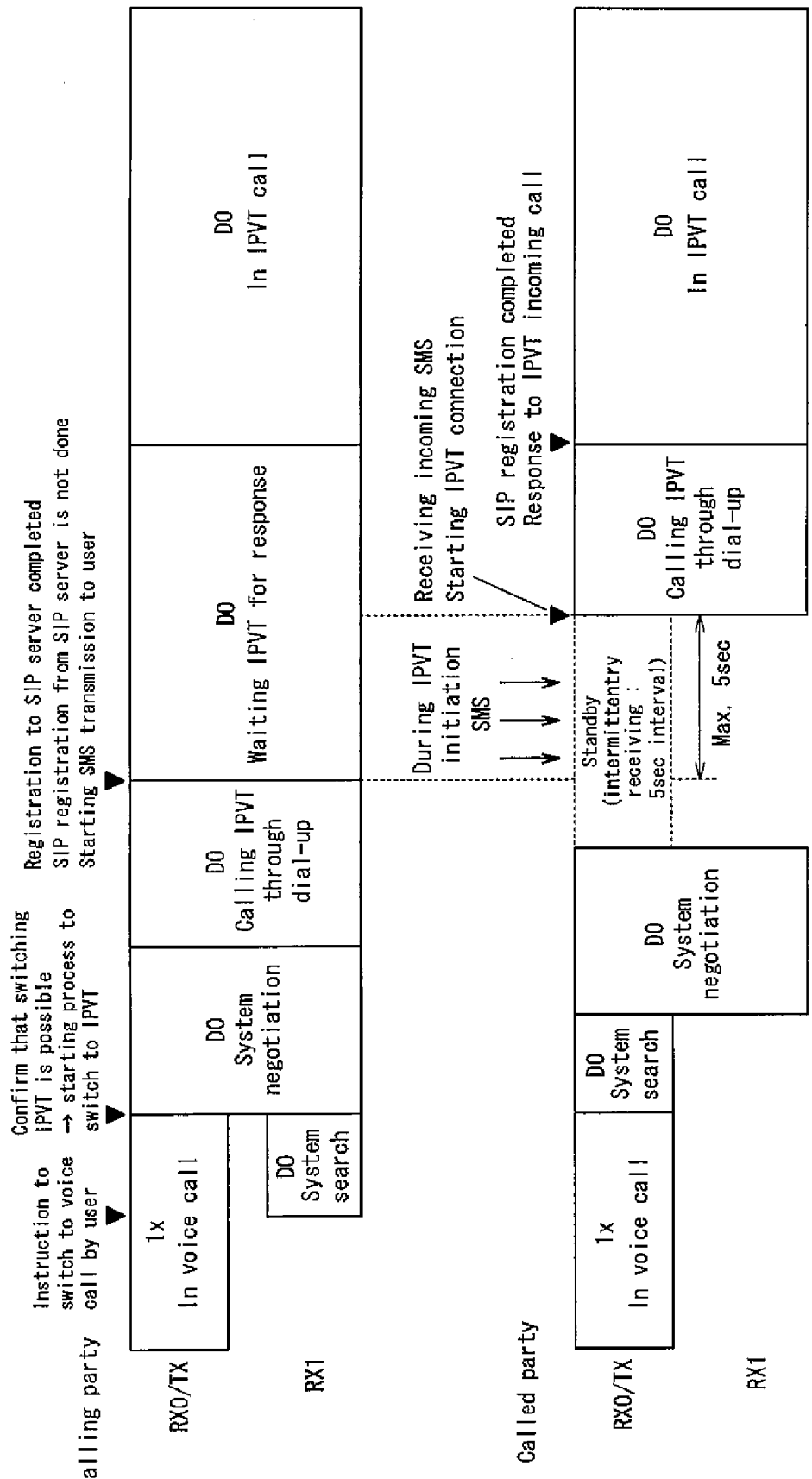
FIG. 12 is a diagram showing system status of transmitter-receiver and receiver units when switching is made from voice telephony communication to IPVT communication.

FIG. 12 shows a diagram showing system status of the transmitter-receiver and receiver units when switching is done from voice telephony communication to IPVT communication. The system status of the transmitter-receiver units (RX0/TX) and the receiver units (RX1) of a calling party and a called party or recipient is shown in chronological order from left to right. The upper half of each of the calling party part and the called party part represents the system status of the transmitter-receiver unit (RX0/TX) and the lower half represents the system status of the receiver unit (RX1). When an instruction to switch from voice telephony communication using the 1x system to IPVT communication using the EVDO system is issued by a user, the controller 28 performs a system detection process for searching (scanning) for the EVDO system by using the receiver unit RX1 while continuing the voice telephony call by using the transmitter-receiver unit (RX0/TX).

When the controller 28 detects the EVDO system through the system detection process and determines that switching to IPVT is possible, the controller 28 performs a process for clearing the voice telephony communication and system negotiation (system setting) with the EVDO system. The controller 28 also performs a dialup IPVT transmission process in the EVDO system to call the party, with which the mobile phone set has been communicating through the 1x system, using the same telephone number as that in the 1x system. Identifiers of the called party in the 1x system may be associated with that of the EVDO system and this association may be stored in an address book, the identifier of the called party in the EVDO system may be searched for on the basis of the identifier of the called party with which the mobile phone set has been communicating in the 1x system, and the called party may be called on the basis of the identifier of the called party found. Then, registration with an SIP server is performed and an INVITE message is transmitted.

If the terminal of the called party has been registered with the SIP server, the INVITE message is transmitted to the terminal of the called party, otherwise, an SMS (Short Message Service) message for causing the terminal to register with the SIP server is transmitted to the terminal of the called party. When a response indicating the arrival of the incoming call is sent from the terminal of the called party, the controller 28 starts the IPVT call using the EVDO system. If the EVDO system cannot be found in the system detection process and switching to IPVT is impossible, the controller 28 output a response to the instruction to switch to IPVT issued from the user that indicates that the switching is impossible. When a system switching is made, preferably a higher-level application is not changed and the same application is used.

Figure 13:
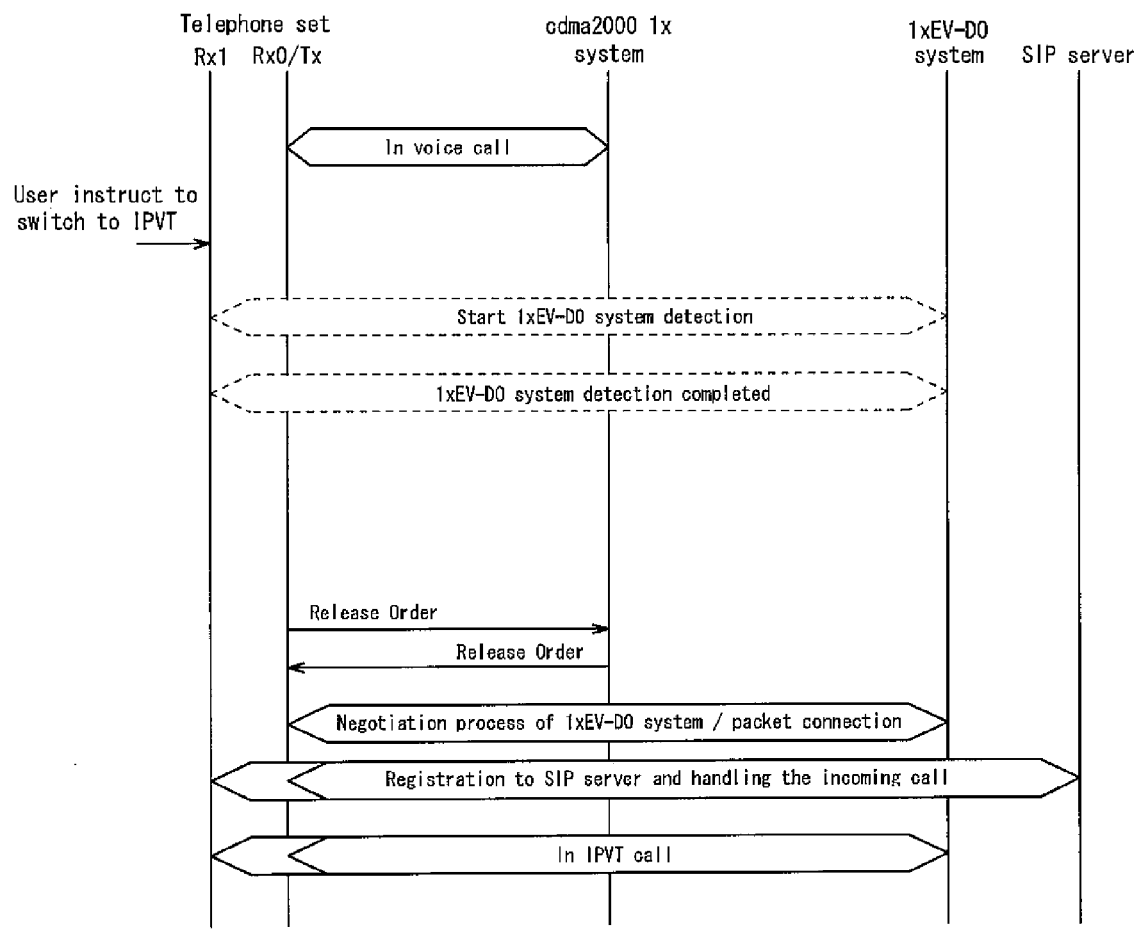
FIG. 13 is a sequence diagram illustrating switching from voice telephony communication to IPVT communication.

FIG. 13 is a sequence diagram illustrating switching from voice telephony communication to IPVT communication. When an instruction to switch to IPVT is issued by a user during a voice telephony call using the transmitter-receiver unit (RX0/TX), the receiver unit (RX1) is used to start searching for an EVDO system while performing the voice telephony call by using the transmitter-receiver unit (RX0/TX). When the EVDO system is detected, a Release Order signal is transmitted and received between the transmitter-receiver (RX0/TX) and the 1x system to perform a process for clearing the voice telephony call. Then, system negotiation and packet connection (dialup transmission) processes are performed between the transmitter-receiver unit (RX0/TX) and the EVDO system. Then, registration with an SIP server is performed and an INVITE message is transmitted. When a response indicating arrival of the message is returned from the opposite terminal, IPVT communication is started through the EVDO system.

Figure 14:
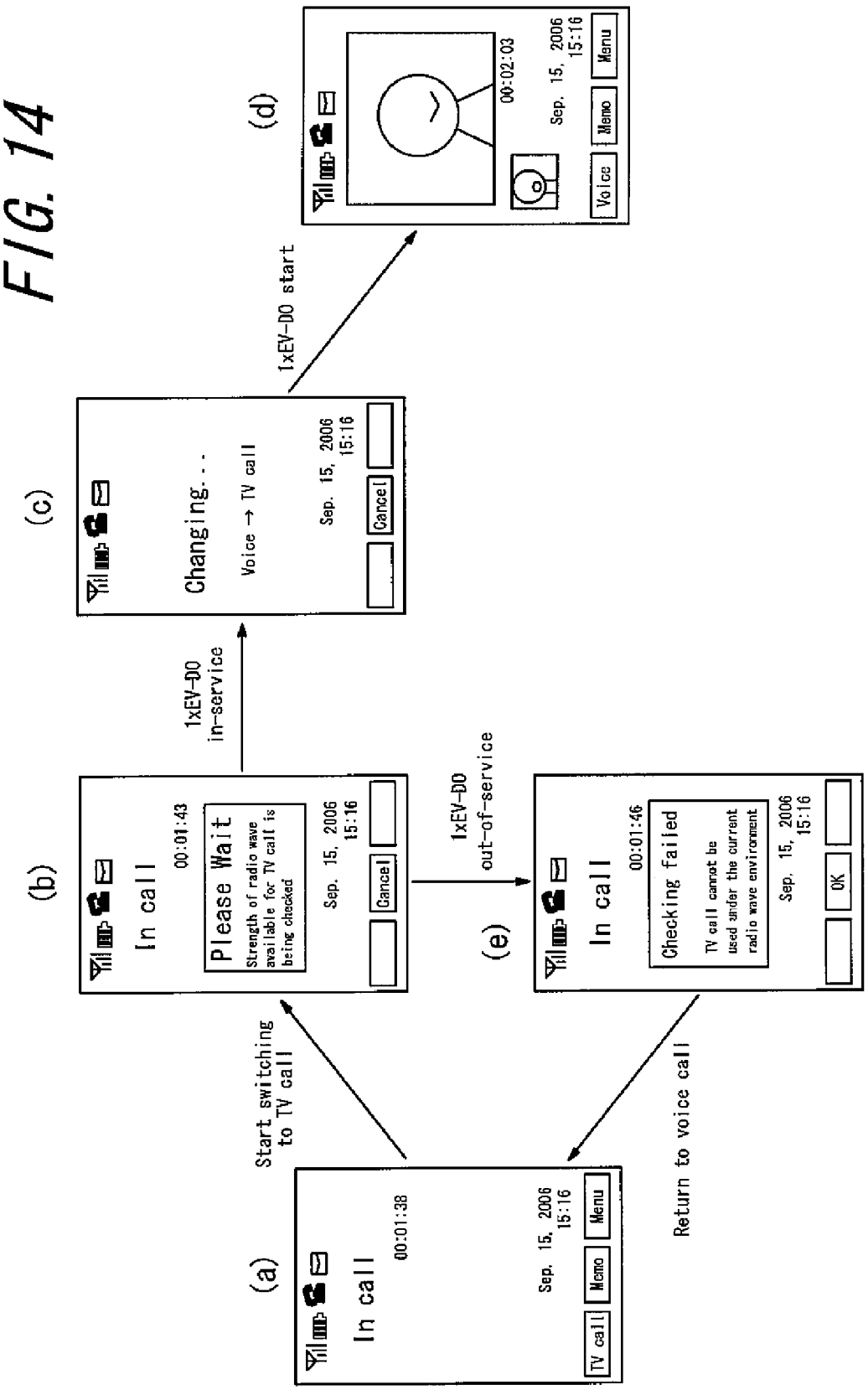
FIG. 14 is a diagram showing screen transitions on a display of the mobile phone set.

FIG. 14 shows a diagram showing screen transitions on a display of a mobile phone set. Part (a) of FIG. 14 shows a screen displayed on the display 30 during a voice telephony call. When a user presses a "TV call (Video)" key to instruct the mobile phone set to switch to IPVT telephony, the receiver unit starts scanning (searching) for an EVDO system and a message "please wait. Strength of a radio wave available for video call is being checked." is displayed on the screen during the system scan as shown in part (b). When the EVDO system is successfully detected, a message "Changing . . . from Voice to Video" is displayed on the screen as shown in part (c) while voice telephony call clear-down, EVDO system negotiation, and EVDO dialup IPVT transmission processing are performed. When a response is returned from the intended or opposite party and a voice telephony call using the EVDO system is started, a video telephony image is displayed on the screen as shown in part (d). If the EVDO system cannot be detected while the screen shown in part (b) is displayed, a response message indicating that switching to video telephony cannot be made ("Checking failed. Video call cannot be used under the current radio wave environment.") is displayed as shown in part (e) and the mobile phone goes back to (continues) the voice telephony.

Figure 15:
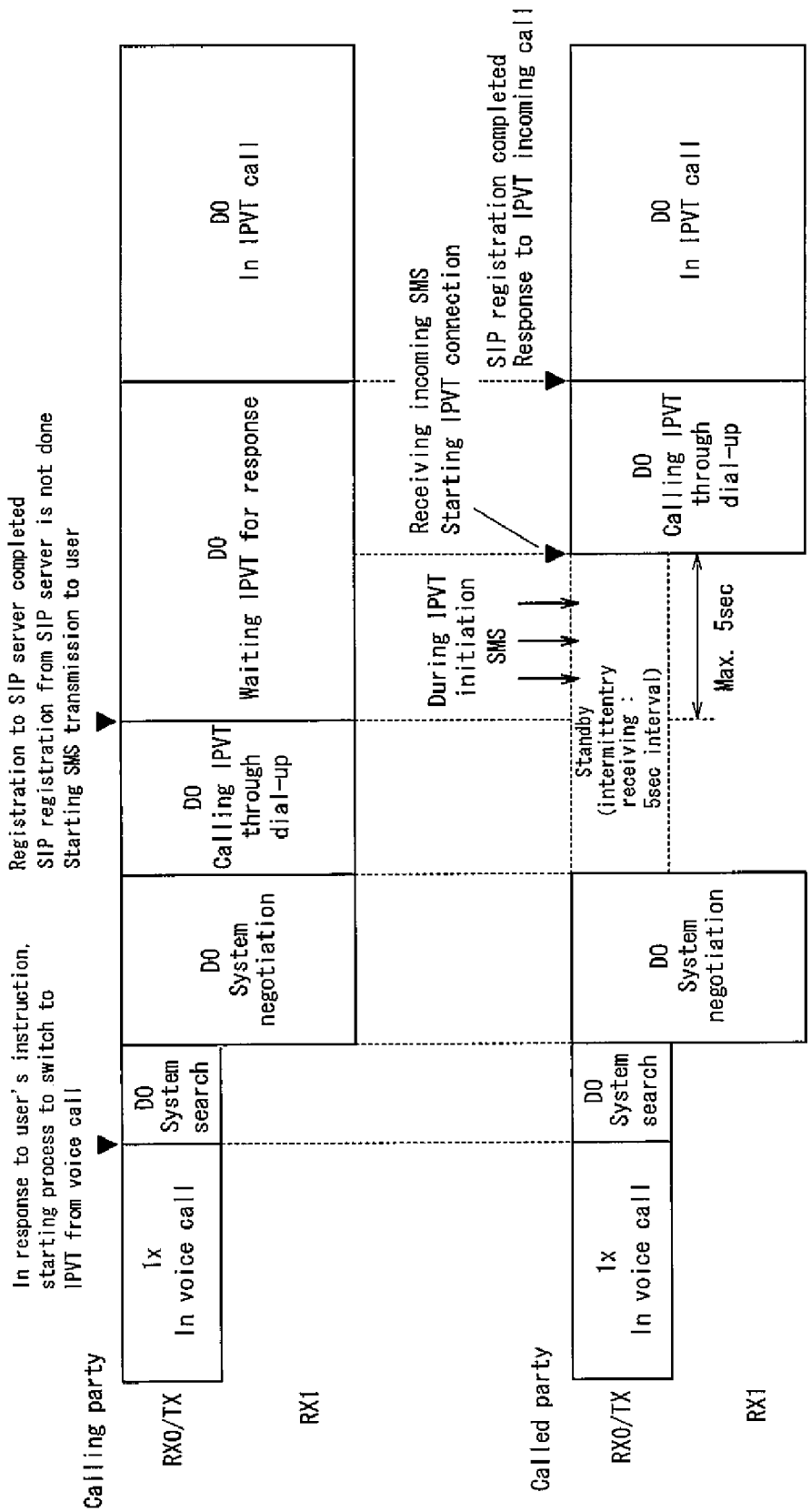
FIG. 15 is a diagram illustrating a method for detecting an EVDO system and switching from voice telephony communication to IPVT communication after a voice telephony call is cleared.

FIG. 15 is a diagram illustrating switching from a voice telephony call to an IPVT call by detecting an EVDO system after the voice telephony call is cleared. As shown in FIG. 15, switching from voice telephony communication to IPVT communication can break connection if the EVDO system is still out-of-service or unreachable and a radio wave signal from the EVDO cannot be captured and switching to IPVT cannot be made in the method of switching from voice telephony to IPVT by detecting the EVDO system after the voice telephony call is cleared or finished. According to the embodiment of the present invention, in contrast, the call is not broken because the EVDO system is detected and determination is made that switching to IPVT is possible, before switching from voice telephony to IPVT is made. If a radio wave signal from the EVDO system cannot be captured, the failure of the switching is notified to the user to allow the user to continue the voice telephony call. Furthermore, in the method in FIG. 15, the voice telephony call is cleared before the EVDO system is detected, whereas in the method of the present invention the EVDO system is already detected during the voice telephony call instead of being searched for after the voice telephony call is cleared, therefore the time required for switching from the voice telephony call to the IPVT call can be reduced.

It is note that the present invention is not limited to the applications in the embodiments described above.

Figure 16:
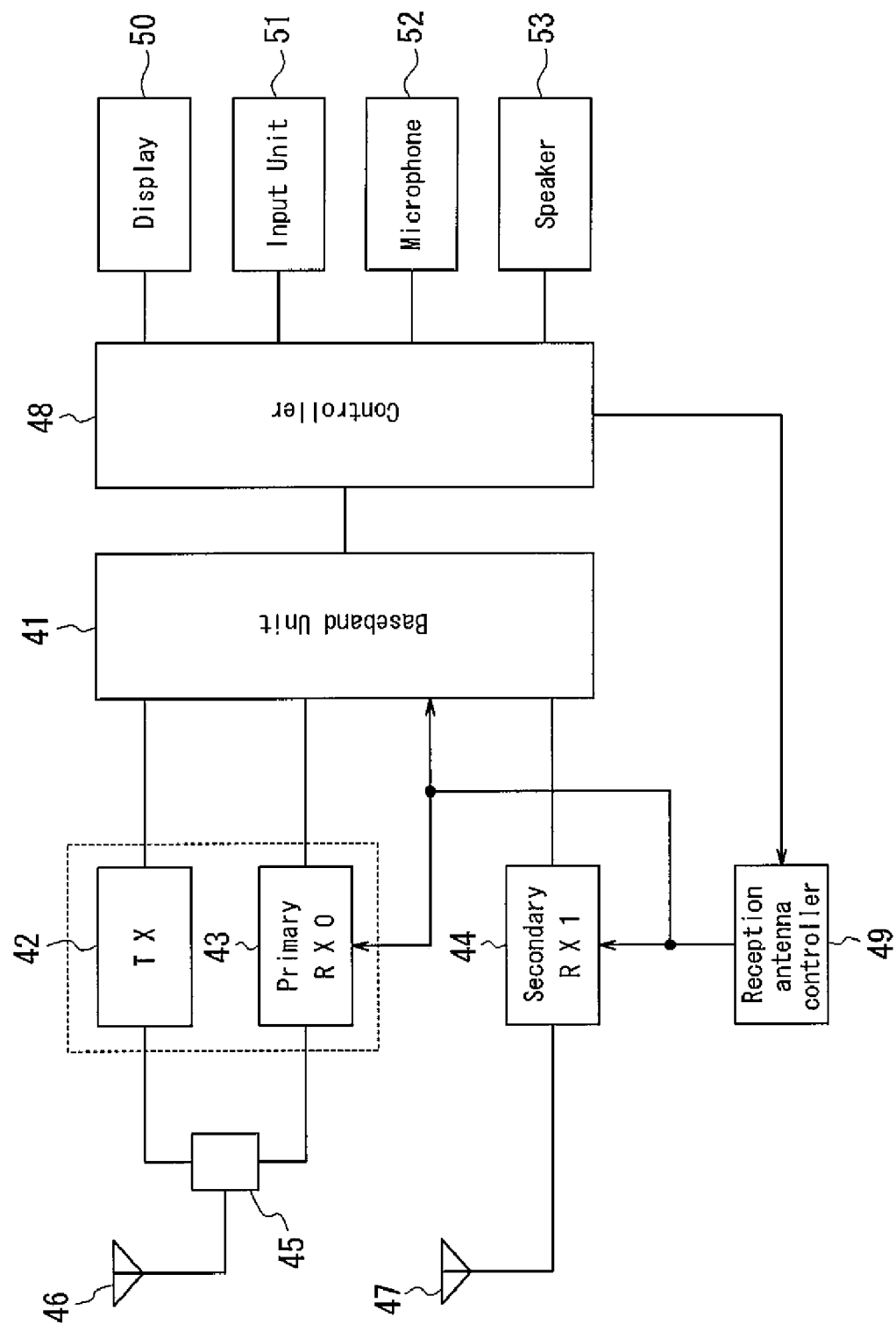
FIG. 16 is a functional block diagram schematically showing a configuration of a mobile phone set according to a fourth embodiment.

A fourth embodiment of the present invention will be described next with reference to drawings. FIG. 16 is a functional block diagram schematically showing a configuration of a mobile phone set which is a wireless communication device according to the fourth embodiment. In a similar fashion to the mobile phone set shown in FIG. 1, the mobile phone set in the fourth embodiment has a first wireless communication system using cdma2000 1x in the 800 MHz and 2 GHz bands (hereinafter sometimes simply referred to as the 1x system) and a second wireless communication system using cdma2000 1xEV-DO (hereinafter sometimes referred to as the EVDO system) and the capability of receiving GPS-frequency signals in the 1.5 GHz band.

The mobile phone set shown in FIG. 16 includes a baseband unit 41, a transmitter (TX) 42, a primary receiver (primary RX0) 43, a secondary receiver (secondary RX1) 44, a duplexer 45, a primary antenna 46, a secondary antenna 47, a controller 48, a reception antenna controller 49, a display 50, an input unit 51, a telephone microphone 52, and a telephone speaker 53.

The transmitter (TX) 42, the primary receiver (primary RX0) 43, and the secondary receiver (secondary RX1) 44 are connected to the baseband unit 41 including a modulating circuit and a demodulating circuit. The transmitter 42 and the primary receiver 43 are connected to the primary antenna 46 through the duplexer 45 and are capable of transmitting and receiving signals in the 800 MHz and 2 GHz bands. The secondary receiver 44 is connected to the secondary antenna 47 and is capable of receiving signals in the 800 MHz, 2 GHz, and 1.5 GHz bands independently of the primary receiver 43. The transmitter 42, the primary receiver 43, the duplexer 45, and the primary antenna 46 make up a transmitter-receiver unit and the secondary receiver 44 and the secondary antenna 47 make up a receiver unit.

In a method for wireless communication by the mobile phone set shown in FIG. 16, the receiver unit (RX1) is used to search (scan) for an EVDO system when a message indicating the arrival of an incoming IPVT call is received from an SIP server during a voice telephony call through a 1x system using the transmitter-receiver unit (RX0/TX).

Figure 17:
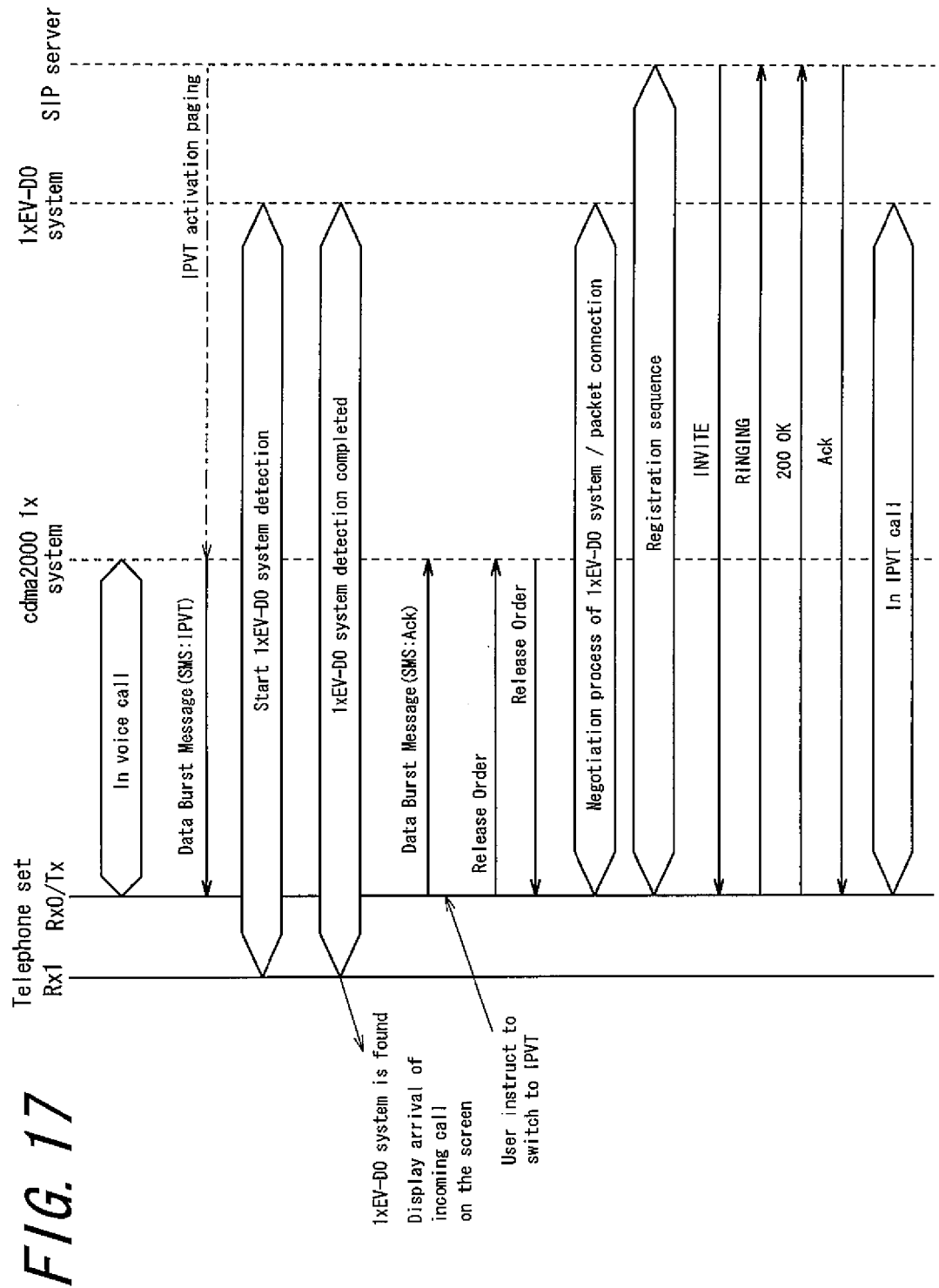
FIG. 17 is a sequence diagram illustrating an operation when a message indicating the arrival of an incoming IPVT call is received during a voice telephony call.

FIG. 17 is a sequence diagram illustrating a process performed when a message indicating the arrival of an incoming IPVT call is received during a voice telephony call. When the controller 48 receives a DataBurst message (SMS: IPVT) indicating the arrival of an incoming IPVT call through a 1x system from an SMS (Short Message Service) server in response to an IPVT activation call from an SIP server during a voice telephony call through the 1x system using the transmitter-receiver unit (RX0/TX), the controller 48 starts searching for an EVDO system by using the receiver unit (RX1) while continuing the voice telephony call using the transmitter-receiver unit (RX0/TX). When the controller 48 detects the EVDO system and determines that switching to IPVT is possible, the controller 48 displays the arrival of a call on the display 50 and transmits a DataBurst message (SMS: Ack) from the transmitter-receiver unit (RX0/TX) to the 1x system.

When an instruction to switch from the voice telephony through the 1x system to IPVT through the EVDO system is received from the user through the input unit 51 shown in FIG. 16, a Release Order signal is transmitted and received between the transmitter-receiver unit (RX0/TX) and the 1x system to clear the voice telephony call. Then system negotiation and packet connection (dialup connection) processes are performed between the transmitter-receiver (RX0/TX) and the EVDO system. Then registration with an SIP server is performed. When an INVITE message is transmitted from the SIP server, Ringing is transmitted to the opposite terminal through the SIP server. "200 OK" reply message is transmitted to the opposite terminal. When an ACK message is received from the party, connection with the party is established. Then, IPVT communication with the party through the EVDO system is started.

Figure 18:
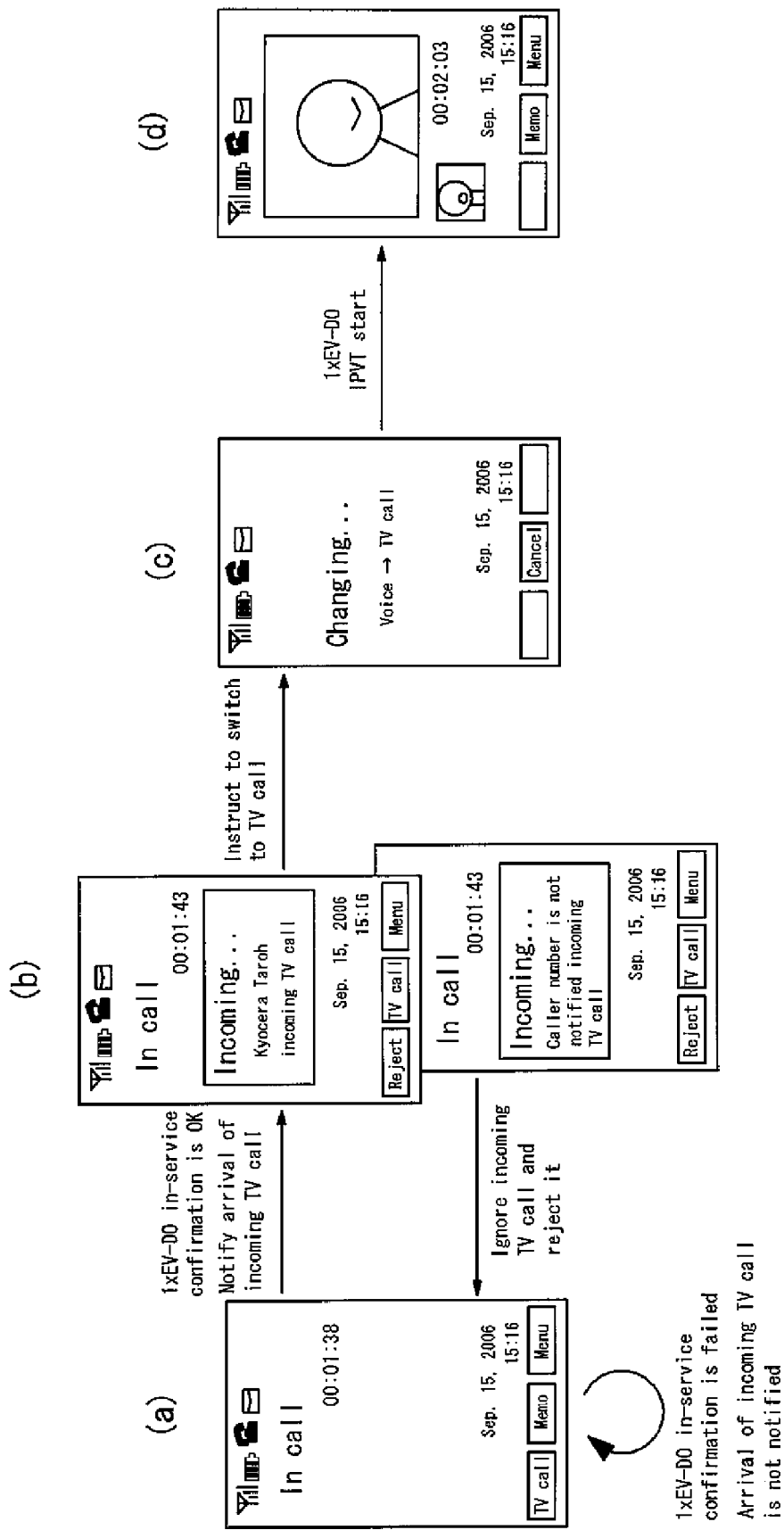
FIG. 18 is a diagram showing screen transitions on a display of the mobile phone set.

FIG. 18 shows a diagram showing screen transitions on the display of the mobile phone terminal. Part (a) in FIG. 18 represents a screen displayed on the display 50 during a voice telephony call. When an incoming IPVT call is notified, the receiver unit starts searching for an EVDO system. Notification of the arrival of the IPVT call is not displayed during the search. When the EVDO system is detected, a message "Incoming .... Incoming video call from xxx" is displayed on the display as shown in part (b) to notify the user of the arrival of the IPVT call. If the EVDO system is not detected, the voice telephony call is continued without presenting notification to the user. When the user depresses a "Video call" key to instruct the mobile phone set to switch to IPVT, a message "Changing ... voice to video" is displayed on the display as shown in part (c). When connection with the intended or opposite terminal is established, a video phone image is displayed as shown in part (d). If the user ignores the incoming call and does not press a key for a predetermined time duration while the screen shown in part (b) is displayed, or the user presses a "Rejection" key, the display returns to the voice telephony screen as shown in parts (b) to (a).

Figure 19:
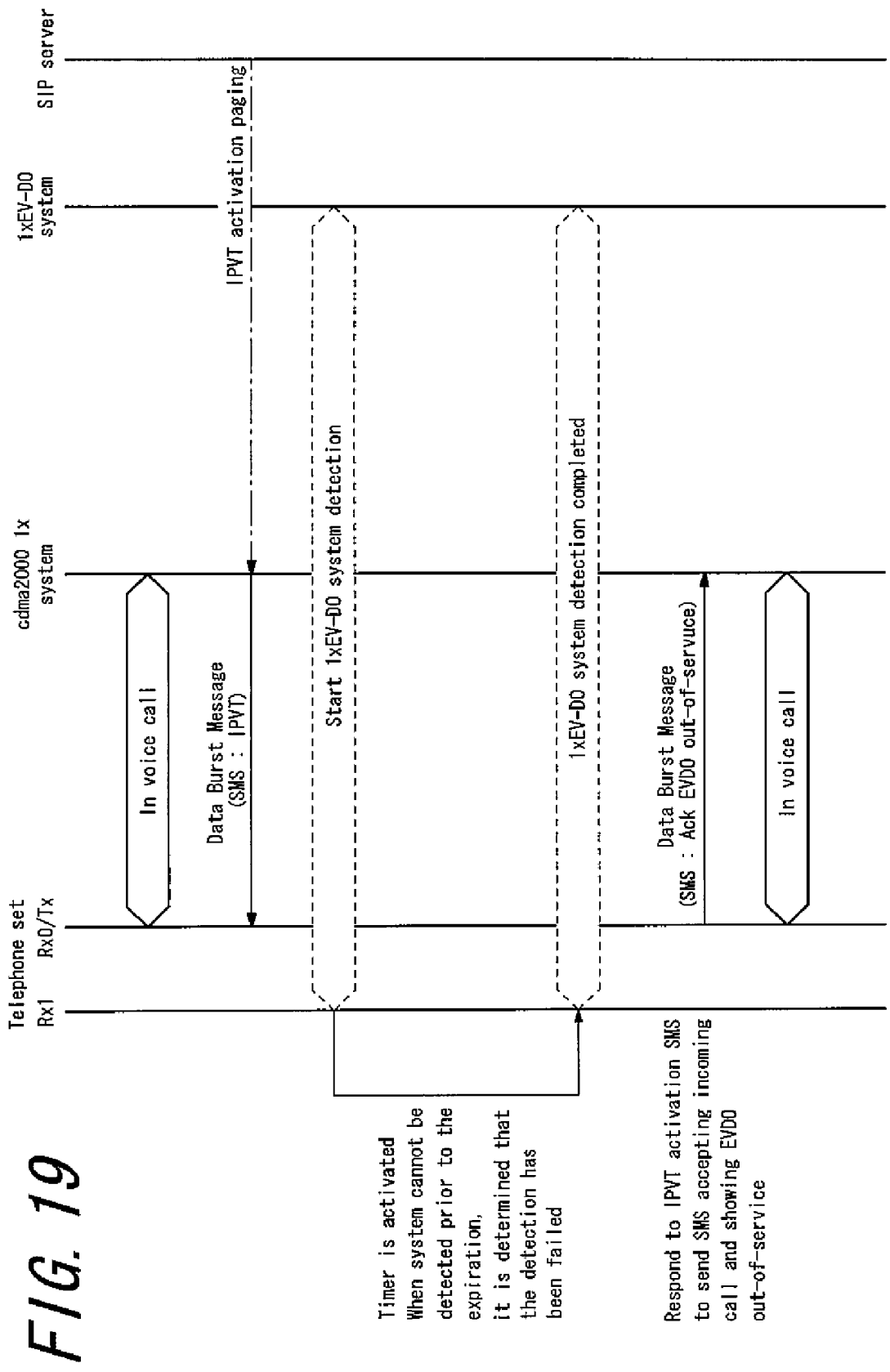
FIG. 19 is a sequence diagram illustrating an operation in which search for an EVDO system is started but an EVDO system cannot be detected.

FIG. 19 is a sequence diagram illustrating an operation in which search for an EVDO system is started while the screen shown in part (a) of FIG. 18 is displayed, but the EVDO system cannot be found. When the controller 48 receives a DataBurst message (SMS: IPVT) indicating the arrival of an incoming IPVT call through the 1x system by using the transmitter-receiver unit (RX0/TX) during a voice telephony call, the controller 48 starts searching (scanning) for an EVDO system by using the receiver unit (RX1) while continuing the voice telephony call by using the transmitter-receiver unit (RX0/TX). At the same time, the controller 48 activates a timer and when the controller 48 cannot detect an EVDO system for a predetermined time duration, the controller 48 determines that the search has failed and transmits a DataBurst message (SMS: Ack) from the transmitter-receiver unit (RX0/TX) to the 1x system indicating that the EVDO system is out-of-service (unreachable).

Figure 20:
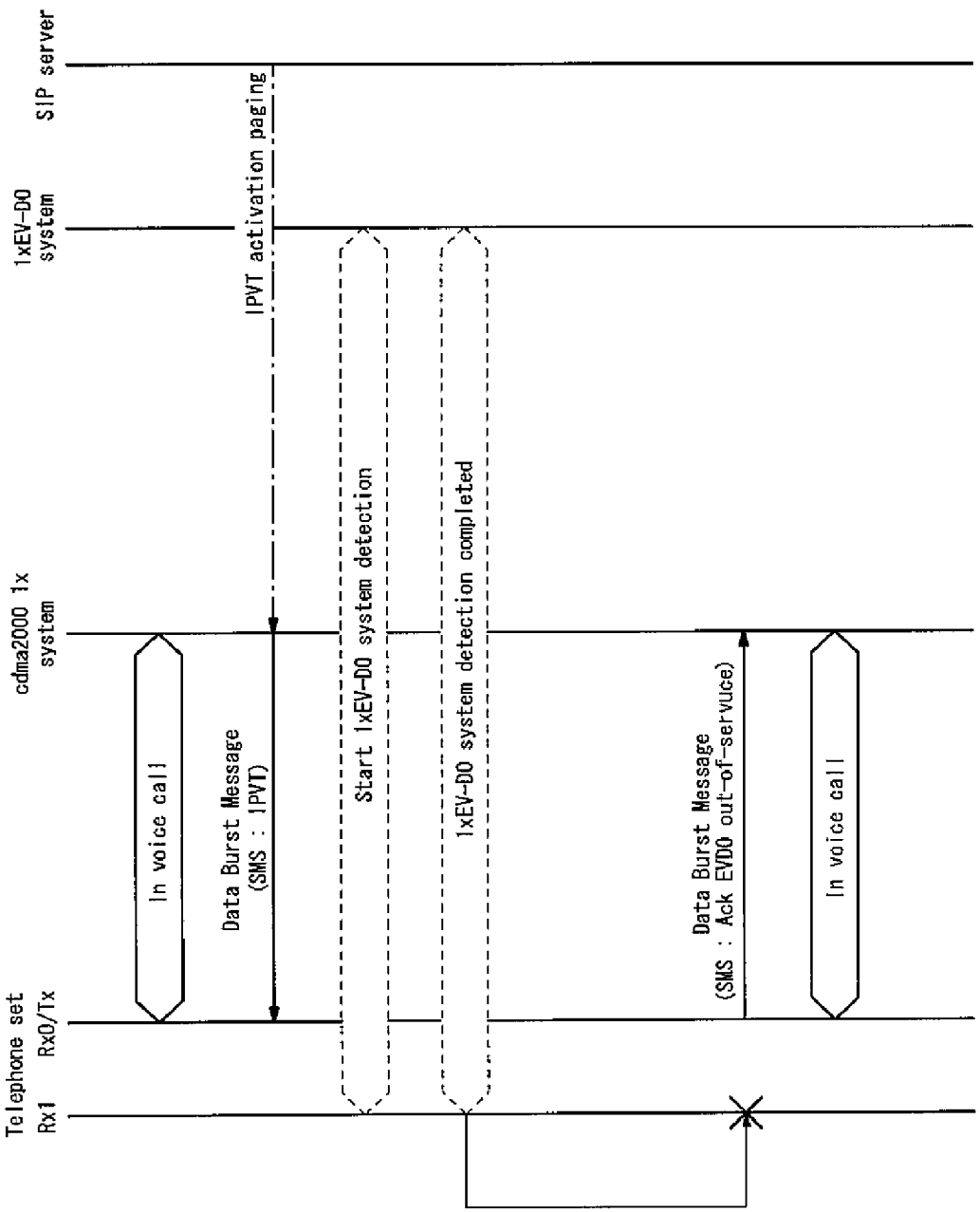
FIG. 20 is a sequence diagram illustrating an operation performed when a user ignores an incoming call and does not depress a key for a predetermined time duration.

FIG. 20 is a sequence diagram illustrating an operation in which a user ignores an incoming call and does not press a key for a predetermined time duration. When the controller 48 receives a DataBurst message (SMS: IPVT) indicating an incoming IPVT call through the 1x system by using the transmitter-receiver unit (RX0/TX) during a 1x system voice telephony call by using the transmitter-receiver (RX0/TX), the controller 48 starts searching (scanning) for an EVDO system by using the receiving unit (RX1) while continuing the voice telephony call by using the transmitter-receiver (RX0/TX). When an EVDO system is detected, the controller 48 activates a timer. If the user does not depresses a key for a predetermined time duration, the controller 48 determines that the user rejects the incoming call, and transmits a DataBurst message (SMS: Ack) indicating rejection of the incoming call to the 1x system through the transmitter-receiver unit (RX0/TX).

Figure 21:
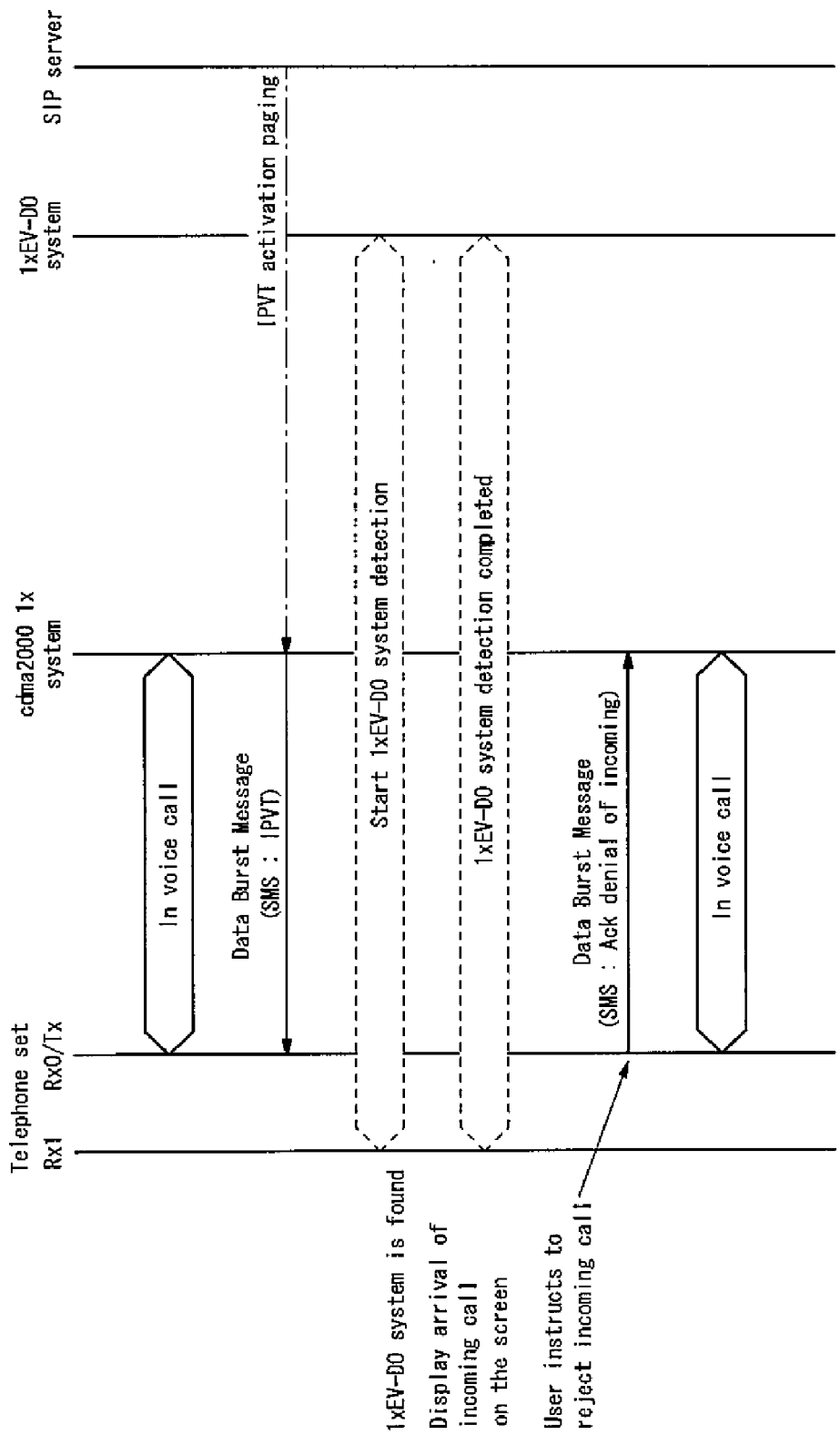
FIG. 21 is a sequence diagram illustrating an operation performed when the user depresses a "Reject" key.

FIG. 21 is a sequence diagram illustrating an operation performed when the user presses a "Rejection" key while the screen shown in part (b) of FIG. 18 is being displayed. When the controller 48 receives a DataBurst message (SMS: IPVT) indicating an IPVT incoming call through a 1x system during a 1x system voice telephony call by using the transmitter-receiver (RX0/TX), the controller 48 starts searching (scanning) for an EVDO system while continuing the voice telephony call by using the transmitter-receiver (RX0/TX). When the controller 48 detects an EVDO system, the controller 48 displays an incoming call screen shown in part (b) of FIG. 18. If the user presses the "Rejection" key here, the controller 48 transmits a DataBurst message (SMS: Ack) indicating rejection of the incoming call to the 1x system through the transmitter-receiver (RX0/TX).

As has been described above, according to the present invention, when a first wireless communication system receives a message indicating an incoming call of a second wireless communication system during a call through the first wireless communication system using a transmitter-receiver unit, a check is performed as to whether switching to the second wireless communication system is possible by using a receiver unit and then the arrival of the incoming call is notified to a user, and thus the user can respond to the incoming call.

The present invention is not limited to the applications in the embodiments described above.

INDUSTRIAL APPLICABILITY

According to the present invention, a first wireless communication system is detected during a call using a second wireless communication system and a check is made as to whether switching between the systems is possible before switching from the call using the second wireless communication system to the first wireless communication system. Therefore, the call is not interrupted and the time required for switching can be reduced.

Furthermore, according to the present invention, the second wireless communication system is detected during a call using the first wireless communication system and a check is made as to whether switching between the systems is possible before switching from the call using the first wireless communication system to a call using the second wireless communication system. Therefore, the call is not interrupted and the time required for switching can be reduced.

Still furthermore, according to the present invention, when a message indicating an incoming call of the second wireless communication system is received in the first wireless communication system during a call using the first wireless communication system using a transmitter-receiver unit, a check is performed as to whether switching to the second wireless communication is possible by using a receiving unit, then a user is notified of the incoming call. Therefore the user can respond the incoming call.

What is claimed is:

1. A wireless communication device comprising:
   a transmitter-receiver unit capable of transmitting and receiving information through a first wireless communication system and a second wireless communication system;
   a receiver unit capable of receiving information through the first wireless communication system and the second wireless communication system;
   a setter to set a mode in which the receiver unit is switched from the second wireless communication system to the first wireless communication system at a predetermined timing during a call through the second wireless communication system using at least the transmitter-receiver unit and/or the receiver unit to perform standby processing for the first wireless communication system using the receiver unit;
   an instruction unit for instructing to switch from a call through the second wireless communication system using the transmitter-receiver unit and/or the receiver unit to a call through the first wireless communication system using the transmitter-receiver unit; and
   a controller for halting, when the first wireless communication system transitions from a standby state, in which standby processing is performed, to out of service state in the mode set by the setter, the standby processing for the first wireless communication system using the receiver unit, and for performing, when detecting an instruction to switch issued through the instruction unit in the halt state, a system detection process for detecting the first wireless communication system by using the receiver unit.

2. The wireless communication device according to claim 1,
   wherein when the first wireless communication system is detected by the system detection process, the controller performs a process for clearing a call through the second wireless communication system and performs a process for transmitting a signal to a party with which the device has been communicating through the second wireless communication system, by using the transmitter-receiver unit through the first wireless communication system.

3. The wireless communication device according to claim 1,
   wherein if the first wireless communication system is not detected by the system detection process, the controller outputs a response to the instruction to switch which indicates that switching is impossible.

4. The wireless communication device according to claim 1,
   wherein the response indicating that switching is impossible is displayed on a screen.

5. A wireless communication device comprising:
   a transmitter-receiver unit capable of transmitting and receiving information through a first wireless communication system and a second wireless communication system;
   a receiver unit capable of receiving information through the first wireless communication system and the second wireless communication system;
   a setter to set a mode in which the receiver unit is switched from the second wireless communication system to the second wireless communication system at a predetermined timing during a call through the second wireless communication system using at least the transmitter-receiver unit and the receiver unit, and to perform standby processing for the first wireless communication system using the receiver unit;
   an instruction unit for instructing to switch from a call through the second wireless communication system using the transmitter-receiver unit and the receiver unit to a call through the first wireless communication system using the transmitter-receiver unit; and
   a controller for halting, when the first wireless communication system transitions from a standby state, in which standby processing is performed, to out of service state in the mode set by the setter, the standby processing for the first wireless communication system using the receiver unit, and for performing, when detecting an instruction to switch issued through the instruction unit in the halt state, a process for clearing the call through the second wireless communication system by using the transmitter-receiver unit and performs a system detection process for detecting the first wireless communication system by using the receiver unit.

6. A wireless communication method using a transmitter-receiver unit capable of transmitting and receiving information through a first wireless communication system and a second wireless communication system and a receiver unit capable of receiving information through the first wireless communication system and the second wireless communication system, comprising the steps of:
   when the first wireless communication system transitions from a standby state in which standby processing is performed to out of service state in a mode in which the receiver unit is switched from the second wireless communication system to the first wireless communication system at a predetermined timing during a call through the second wireless communication system using at least the transmitter-receiver unit and/or the receiver unit, halting standby processing for the first wireless communication system using the receiver unit; and
   when an instruction to switch from a call through the second wireless communication system using the transmitter-receiver unit and/or the receiver unit to a call through the first wireless communication system using the transmitter-receiver unit during the halt state, performing a process for detecting the first wireless communication system by using the receiver.

7. A wireless communication method using a transmitter-receiver unit capable of transmitting and receiving information through a first wireless communication system and a second wireless communication system and a receiver unit capable of receiving information through the first wireless communication system and the second wireless communication system, comprising the steps of:
   when the first wireless communication system transitions from a standby state, in which standby processing is performed, to out of service state in a mode in which the receiver unit is switched from the second wireless communication system to the first wireless communication system at a predetermined timing during a call through the second wireless communication system using at least the transmitter-receiver unit and/or the receiver unit and, halting standby processing for the first wireless communication system using the receiver unit; and when an instruction to switch from a call through the second wireless communication system using the transmitter-receiver unit and/or the receiver unit to a call through the first wireless communication system using the transmitter-receiver unit during the halt state, performing a process for clearing a call through the second wireless communication system by using the transmitter-receiver unit and performing a process for detecting the first wireless communication system by using the receiver.

8. A wireless communication device comprising:
a transmitter-receiver unit capable of transmitting and receiving information through a first wireless communication system and a second wireless communication system;
a receiver unit capable of receiving information through at least the first wireless communication system and the second wireless communication system;
an instruction unit for instructing to switch from a call through the first wireless communication system using the transmitter-receiver unit to a call through the second wireless communication system using the transmitter-receiver unit; and
a controller for performing, when an instruction to switch issued through the instruction unit is detected during a call through the first wireless communication system using the transmitter-receiver unit, a system detection process for detecting the second wireless communication system by using the receiver unit.

9. The wireless communication device according to claim 8,
wherein, when the second wireless communication system is detected by the system detection process, the controller performs a process for clearing a call through the first wireless communication system using the transmitter-receiver unit and performs system setting of the second wireless communication system by using the transmitter-receiver unit.

10. The wireless communication device according to claim 9,
wherein, after performing system setting of the second wireless communication system by using the transmitter-receiver unit, the controller performs a process for using the second wireless communication system to call a party with which the device has been communicating through the first wireless communication system.

11. The wireless communication device according to claim 8,
wherein if the second wireless communication system is not detected by the system detection process, the controller outputs a response to the instruction to switch indicating that switching is impossible.

12. The wireless communication device according to claim 11,
wherein the response that indicates that switching is impossible is displayed on a screen.

13. A wireless communication method using a transmitter-receiver unit capable of transmitting and receiving information through a first wireless communication system and a second wireless communication system and a receiver unit capable of receiving information through at least the first wireless communication system and the second wireless communication system, comprising the steps of:
making a call through the first wireless communication system using the transmitter-receiver unit; and
when an instruction to switch from a call through the first wireless communication system using the transmitter-receiver unit to a call through the second wireless communication system using the transmitter-receiver unit is detected during the call through the first wireless communication system using the transmitter-receiver unit, performing a system detection process for detecting the second wireless communication system by using the transmitter-receiver unit.

14. A wireless communication device comprising:
a transmitter-receiver unit capable of transmitting and receiving information through a first wireless communication system and a second wireless communication system;
a receiver unit capable of receiving information through at least the first wireless communication system and the second wireless communication system; and
a controller for performing, when receiving a message indicating an incoming call of the second wireless communication system through the first wireless communication system during a call through the first wireless communication system using the transmitter-receiver unit, a system detection process for detecting the second wireless communication system by using the receiver unit.

15. The wireless communication device according to claim 14,
wherein when the second wireless communication system is detected by the system detection process, the controller notifies an incoming call of the second wireless communication system.

16. The wireless communication device according to claim 14,
wherein when receiving an instruction to respond to an incoming call of the second wireless communication system, the controller performs a process for clearing a call through the first wireless communication system using the transmitter-receiver unit and uses the transmitter-receiver unit to perform system setting of the second wireless communication system.

17. A wireless communication method using a transmitter-receiver unit capable of transmitting and receiving information through a first wireless communication system and a second wireless communication system and a receiver unit capable of receiving information through at least the first wireless communication system and the second wireless communication system, comprising the steps of:
making a call through the first wireless communication system using the transmitter-receiver unit; and
when receiving a message indicating an incoming call of the second wireless communication system through the first wireless communication system during a call through the first wireless communication system using the transmitter-receiver unit, performing a system detection process for detecting the second wireless communication system by using the receiver unit.

* * * * *